(12) United States Patent
Fu et al.

(10) Patent No.: US 11,147,251 B1
(45) Date of Patent: Oct. 19, 2021

(54) NATURE-INSPIRED DESIGN AND ENGINEERING OF AUTONOMOUS SEAFOOD CAPTURING, SORTING AND DELIVERING SYSTEM

(71) Applicants: Lillian R Fu, San Jose, CA (US); Eric R Fu, San Jose, CA (US)

(72) Inventors: Lillian R Fu, San Jose, CA (US); Eric R Fu, San Jose, CA (US)

( * ) Notice: Subject to any disclaimer, the term of this patent is extended or adjusted under 35 U.S.C. 154(b) by 0 days.

(21) Appl. No.: 16/836,920

(22) Filed: Apr. 1, 2020

(51) Int. Cl.
*A01K 69/08* (2006.01)
*A01K 81/04* (2006.01)
A01K 81/06 (2006.01)
B64C 39/02 (2006.01)

(52) U.S. Cl.
CPC ............ *A01K 69/08* (2013.01); *A01K 81/04* (2013.01); *A01K 81/06* (2013.01); *B64C 39/024* (2013.01); *B64C 2201/027* (2013.01); *B64C 2201/128* (2013.01)

(58) Field of Classification Search
CPC ........ A01K 69/06; A01K 69/08; A01K 69/10; A01K 99/00; A01K 81/04
USPC .......................................... 43/100, 102, 105
See application file for complete search history.

(56) References Cited

U.S. PATENT DOCUMENTS

| | | | | |
|---|---|---|---|---|
| 513,483 A * | 1/1894 | Cole | ...................... | A01K 69/06 43/102 |
| 586,863 A * | 7/1897 | Nelson | .................. | A01K 69/06 43/102 |
| 1,903,276 A * | 3/1933 | Susi | ........................ | A01K 69/08 43/102 |
| 3,374,494 A * | 3/1968 | Hunley | .................... | B63B 22/06 441/24 |
| 3,426,472 A * | 2/1969 | Richard | ................. | A01K 69/08 43/100 |
| 3,638,346 A * | 2/1972 | Stein | ....................... | A01K 74/00 43/17.1 |
| 3,724,120 A * | 4/1973 | Richard | ................. | A01K 69/06 43/100 |
| 3,754,348 A * | 8/1973 | Ramsey | ................. | A01K 69/08 43/103 |
| 3,772,818 A * | 11/1973 | Gardina | .................. | A01K 69/08 43/100 |
| 3,852,908 A * | 12/1974 | Christopher | ........... | A01K 63/00 43/102 |

(Continued)

FOREIGN PATENT DOCUMENTS

| | | | | |
|---|---|---|---|---|
| EP | 3417702 B1 * | 5/2020 | ............. | A01K 83/00 |
| EP | 3417703 B1 * | 5/2020 | ............. | A01K 99/00 |

(Continued)

*Primary Examiner* — Darren W Ark
(74) *Attorney, Agent, or Firm* — Grants Law Firm; Allan Grant

(57) ABSTRACT

Presented is a system and method via nature-inspired design and engineering to autonomously fish, sort and deliver the catch. It implements rope-less fishing via a novel variable buoyancy device and an autonomous aerial and underwater vehicle as a fishing gear carrier. Its versatile capabilities are comprised of the AI sorting capability to comply with regulations, the capability to capture renewable energy to reduce operating costs, the capability to both passively fish with bait and proactively hunt for fish and the capability to gather intelligence to find optimal fishing grounds.

17 Claims, 17 Drawing Sheets

(56) References Cited

U.S. PATENT DOCUMENTS

| | | | | |
|---|---|---|---|---|
| 3,860,983 | A * | 1/1975 | Furth | B63B 22/02 441/2 |
| 4,034,693 | A * | 7/1977 | Challenger | A01K 69/08 114/333 |
| 4,244,323 | A * | 1/1981 | Morimura | A01K 61/60 43/102 |
| 4,255,467 | A * | 3/1981 | Bounds | C23C 2/34 118/47 |
| 4,262,379 | A * | 4/1981 | Jankiewicz | A01K 69/08 102/406 |
| 4,373,288 | A * | 2/1983 | McCrink | A01K 69/06 43/100 |
| 4,406,083 | A * | 9/1983 | Hart | A01K 69/06 43/105 |
| 4,507,093 | A * | 3/1985 | Norvell | B63C 7/10 251/297 |
| 4,644,682 | A * | 2/1987 | Cloud | A01K 73/06 43/100 |
| 4,831,774 | A * | 5/1989 | Gonzalez | A01K 69/06 43/100 |
| 4,860,487 | A * | 8/1989 | Kingston | B63B 22/22 43/102 |
| 5,331,148 | A * | 7/1994 | Kvassheim | B07C 5/10 250/221 |
| 5,386,841 | A * | 2/1995 | Stilwagen | A01K 69/06 134/104.4 |
| 5,946,850 | A * | 9/1999 | Sarkisyan | A01K 69/06 43/100 |
| 6,261,142 | B1 * | 7/2001 | Fiotakis | A01K 69/06 441/11 |
| 6,567,792 | B1 * | 5/2003 | Arnold | A01K 69/06 705/50 |
| 6,710,714 | B2 * | 3/2004 | Conway | A01K 1/033 119/712 |
| 6,739,924 | B1 * | 5/2004 | Groen | B63B 22/04 441/21 |
| 6,880,290 | B2 * | 4/2005 | Mahoney | A01K 69/00 43/100 |
| 7,232,354 | B2 * | 6/2007 | Olson | B63B 22/10 441/7 |
| 8,104,221 | B2 * | 1/2012 | Walter | A01M 23/16 43/61 |
| 8,112,934 | B2 * | 2/2012 | Alter | A01M 31/002 43/61 |
| 8,359,783 | B1 * | 1/2013 | Kamery | A01M 23/20 43/61 |
| 8,375,623 | B2 * | 2/2013 | Havens | A01K 69/06 43/100 |
| 8,553,501 | B1 * | 10/2013 | Cota | G01V 1/38 367/131 |
| 8,776,430 | B1 * | 7/2014 | Kamery | A01M 23/00 43/61 |
| 8,919,034 | B2 * | 12/2014 | Alhuwaishel | A01M 23/10 43/100 |
| 9,091,550 | B1 * | 7/2015 | Smith | G06Q 50/02 |
| 9,277,729 | B1 * | 3/2016 | Wright | A01K 1/03 |
| 9,807,998 | B2 * | 11/2017 | Kamery | A01M 23/18 |
| 9,814,226 | B2 * | 11/2017 | Opshaug | A01K 97/125 |
| 9,999,213 | B2 * | 6/2018 | Yu | A01M 1/223 |
| 10,019,002 | B2 * | 7/2018 | Harnett | B64D 47/02 |
| 10,268,193 | B2 * | 4/2019 | Gan | B64D 1/00 |
| 10,315,528 | B1 * | 6/2019 | Crawford, Jr. | B60L 53/30 |
| 10,375,939 | B2 * | 8/2019 | Partan | A01K 69/06 |
| 10,375,940 | B2 * | 8/2019 | Al-Farhan | A01K 73/12 |
| 10,392,085 | B2 * | 8/2019 | Wang | A01K 99/00 |
| 10,412,950 | B2 * | 9/2019 | Opshaug | A01K 97/125 |
| 10,427,789 | B2 * | 10/2019 | Gan | A01K 99/00 |
| 10,514,024 | B1 * | 12/2019 | Shoemaker, Jr. | F04B 35/04 |
| 10,518,848 | B2 * | 12/2019 | Sinclair | A01K 61/75 |
| 10,638,730 | B2 * | 5/2020 | Garland | A01K 69/08 |
| 10,668,997 | B2 * | 6/2020 | Moses | B63C 9/01 |
| 10,701,913 | B2 * | 7/2020 | Twining | A01M 31/002 |
| 10,725,469 | B2 * | 7/2020 | Harnett | B63G 8/001 |
| 10,881,087 | B1 * | 1/2021 | Poulsen | A01K 69/08 |
| 11,046,401 | B2 * | 6/2021 | Fiorello | A01K 69/08 |
| 2007/0264890 | A1 * | 11/2007 | Brown | A01K 75/04 441/30 |
| 2008/0271362 | A1 * | 11/2008 | Mikhail | A01K 69/06 43/100 |
| 2010/0313465 | A1 * | 12/2010 | Haugen | A01K 69/06 43/102 |
| 2013/0109259 | A1 * | 5/2013 | Abulrassoul | B63C 7/26 441/11 |
| 2013/0206915 | A1 * | 8/2013 | Desaulniers | B64C 39/028 244/165 |
| 2016/0278353 | A1 * | 9/2016 | Martin | A01K 99/00 |
| 2016/0376000 | A1 * | 12/2016 | Kohstall | B63G 8/08 114/313 |
| 2018/0206459 | A1 * | 7/2018 | Crawford | A01K 61/90 |
| 2019/0061890 | A1 * | 2/2019 | Fiorello | B63G 8/08 |
| 2019/0110452 | A1 * | 4/2019 | Greenberg | H04B 13/02 |
| 2019/0367135 | A1 * | 12/2019 | Sinclair | B63B 22/20 |
| 2020/0031438 | A1 * | 1/2020 | Moses | G08B 21/088 |
| 2020/0198743 | A1 * | 6/2020 | Fiorello | B63G 8/22 |
| 2020/0253177 | A1 * | 8/2020 | Abedi | A01K 69/08 |
| 2020/0296925 | A1 * | 9/2020 | Bennett | G06K 7/10297 |
| 2021/0195881 | A1 * | 7/2021 | Martin | A01K 81/06 |

FOREIGN PATENT DOCUMENTS

| | | | | |
|---|---|---|---|---|
| FR | 2656498 | A1 * | 7/1991 | A01K 69/08 |
| FR | 2848066 | A1 * | 6/2004 | A01K 69/06 |
| FR | 2848067 | A1 * | 6/2004 | A01K 69/06 |
| GB | 2178932 | A | 2/1987 | A01K 69/08 |
| GB | 2563681 | B * | 6/2020 | A01K 97/02 |
| GB | 2536682 | B * | 7/2020 | A01K 99/00 |
| JP | 2005073637 | A | 3/2005 | |
| WO | WO-9845169 | A1 * | 10/1998 | B63B 22/02 |
| WO | WO-2017042785 | A1 * | 3/2017 | A01K 69/06 |

* cited by examiner 95  96  97  99
       98  94

NATURE-INSPIRED DESIGN AND ENGINEERING OF AUTONOMOUS SEAFOOD CAPTURING, SORTING AND DELIVERING SYSTEM

BACKGROUND OF THE INVENTION

Crabbing is well known for being an incredibly hazardous profession; professional crabbers run the risk of serious injury and/or death as a part of their livelihood. The fatality rate of crabbers is approximately 300 per every 100,000 workers in both the Alaskan king crab fishing industry as well as the West Coast Dungeness fishing industry. This figure is caused mainly by drowning and hypothermia; the areas where crabbers sail to for the best catches are oftentimes in rough patches of sea that can easily lead to sailing accidents.

Many similarly dangerous jobs have been streamlined and made more efficient while also eradicating occupational hazards by automating components of the process. The presented inventions would automate fishing processes such as crab catching, therefore eliminating many of the hazards involved in the fishing industry.

Some embodiments of the present invention utilize marine environment-friendly rope-less fishing technology. Traditional fishing using a trap involves a rope that connects a buoy on the water surface to a trap on the floor. Such ropes hanging vertically in water column pose risks to marine mammals. The latest assessment of the North Atlantic right whale population is bleak. Of the right whales whose cause of death can be determined, all but calves are found to die from fishing gear entanglements and ship strikes. Fishing gear entanglements currently account for 82% of documented right whale mortalities, while the remaining 18% are caused by ship strikes. An astounding 85% of all right whales bear scars from being entangled at least once in their lives, and more than half have been entangled two or more times. When whales get entangled, they entangle in ropes; they do not get caught in traps or buoys. Therefore, one of the most effective approaches to addressing the entanglement problem will be to remove ropes from fixed fishing gear, particularly for the trap/pot fishery. Rope-less fishing gear is a broad term describing developing technologies that either partially or fully eliminate the vertical rope or line between the fixed bottom-fishing gear (i.e., pots, traps) and a surface buoy. In the context of whale entanglements, the thinking is that reducing the vertical lines in the ocean could reduce, or eventually fully eliminate the entanglements of marine wildlife with fixed fishing gear in the ocean.

Recovery methods that allow a trap to surface on its own include bottom-stowed rope and variable buoyancy traps. The recovery methods disclosed in U.S. Pat. Nos. 6,261,142, 10,375,939 and 6,739,924 belong to the bottom-stowed rope category. The drawback of the recovery using bottom-stowed rope is that the rope is not totally eliminated, nor are such processes of handling the rope as rewinding the rope. There is also a cost to purchase and maintain the rope. Besides duration limitation due to battery capacity, the fishing method disclosed in U.S. Pat. No. 10,268,193 suffers similar drawbacks associated with the lines used in fishing. Variable buoyancy can be created by using a piston pump that changes the volume of a cylinder or compressed air to fill an inflatable bladder. U.S. Pat. No. 7,232,354 discloses a variable buoyancy device. Due to the high pressure at the ocean floor, compared with the method of creating variable buoyancy in the present invention the two above-mentioned methods of creating variable buoyancy are expensive and also difficult to implement. The present invention utilizes heavier-than-water substances such as sand, which is abundant and almost cost-free, to create variable buoyancy. The present invention also has features not presented in the above-mentioned U.S. patents, such as utilizing artificial intelligence (AI) capability to sort catches for purposes including complying with regulations, capturing renewable energy to reduce operating costs and being able to proactively hunt fish besides passively fishing with bait.

As such, there is a need in the industry for this invention, which can save lives by using autonomous devices and artificial intelligence (AI).

There is a need in the art for an Autonomous Seafood Capturing, Sorting, and Delivering System. Additionally, there is a need in the art for an Autonomous Seafood Capturing, Sorting, and Delivering System comprising an unmanned aerial vehicle capable of vertical take-off and landing, which docks and/or connects with a submersible structure that is capable of capturing and sorting seafood.

SUMMARY OF THE INVENTION

This invention was initially inspired by one of nature's seamless fishing and delivering phenomena: as shown in FIG. 5, an eagle can catch a fish out of water on the fly and fly to its nest while carrying the prey.

One of objectives of the invention is to bring automation to labor-intensive and hazardous fishing industries such as the crabbing industry, thereby optimizing the process as well as reducing potential risks.

It is an objective of this invention to help reduce entanglement of marine wildlife by eliminating fishing rope via rope-less fishing. Besides a novel variable buoyancy device inspired by hourglasses, this invention also provides a way to retrieve fishing gear using an autonomous underwater vehicle (AUV) as a fishing gear carrier.

It is an objective of this invention to sort the catches via AI object detection to collect information on an individual catch such as the species of the catch, and the size and sex of the catch if applicable. Based on the detected information, only qualified catches will be kept in order to comply with regulations. This invention provides 2 types of sorting: one at the individual fishing gear and another at a specialized sorting table.

It is an objective of this invention to be able to deliver the catch to a desired destination such as a sorting table at a processing center or the backyard of a house belonging to either a customer or the owner of the fishing gear, just like an eagle brings its catch to its nest.

It is an objective of this invention to capture renewable energy in order to reduce operating costs. Fuel cost is a large portion of the total cost in a conventional fishing operation.

It is an objective of this invention to provide versatile fishing mechanisms. Besides passive fishing such as using a trap with bait or using a fishing line with a hook and bait at one end, this invention also provides a proactive fish hunting mechanism.

It is an objective of this invention to be able to provide intelligence on high concentrations of target fish or shellfish prior to deploying fishing gear or before a new fishing season starts by deploying one or more AI-capable AUVs as scouts to the fishing grounds. Such intelligence on optimal fishing grounds will greatly improve productivity and business competitiveness. Deployed AI-capable AUVs with fishing gear can also provide information for determining where the best fishing spots are based on what it catches in each area.

This invention also provides a design of an autonomous aerial and underwater vehicle (A²UV), which is capable of flying both in the air and going underwater. An A²UV can perform both the tasks of a vertical take-off and landing (VTOL) unmanned aerial vehicle (UAV) and the tasks of an AUV.

BRIEF DESCRIPTION OF THE DRAWINGS

These as well as other features of the present invention will become more apparent upon reference to the accompanying drawings wherein like numerals designate corresponding parts in the several figures summarized as follows.

Other features and advantages of the invention will become apparent from the following detailed description, taken in conjunction with the accompanying drawings, which illustrate, by way of example, various features of embodiments of the invention.

DETAILED DESCRIPTION

The following detailed description and accompanying drawings are provided for the purpose of illustrating and describing presently preferred embodiments of the present invention and are not intended to limit the scope of the invention in any way. It will be understood that various changes in the details, materials, arrangements of parts or operational conditions which have been herein described and illustrated in order to explain the nature of the invention may be made by those skilled in the art within the principles and the scope of the invention.

The various embodiments of the invention shown in FIGS. 8-12 utilize variable buoyancy fishing traps and VTOL UAVs. A fishing trap rises to the surface by changing buoyance, then a VTOL UAV catches and delivers the surfaced trap to destination.

Figure 1:
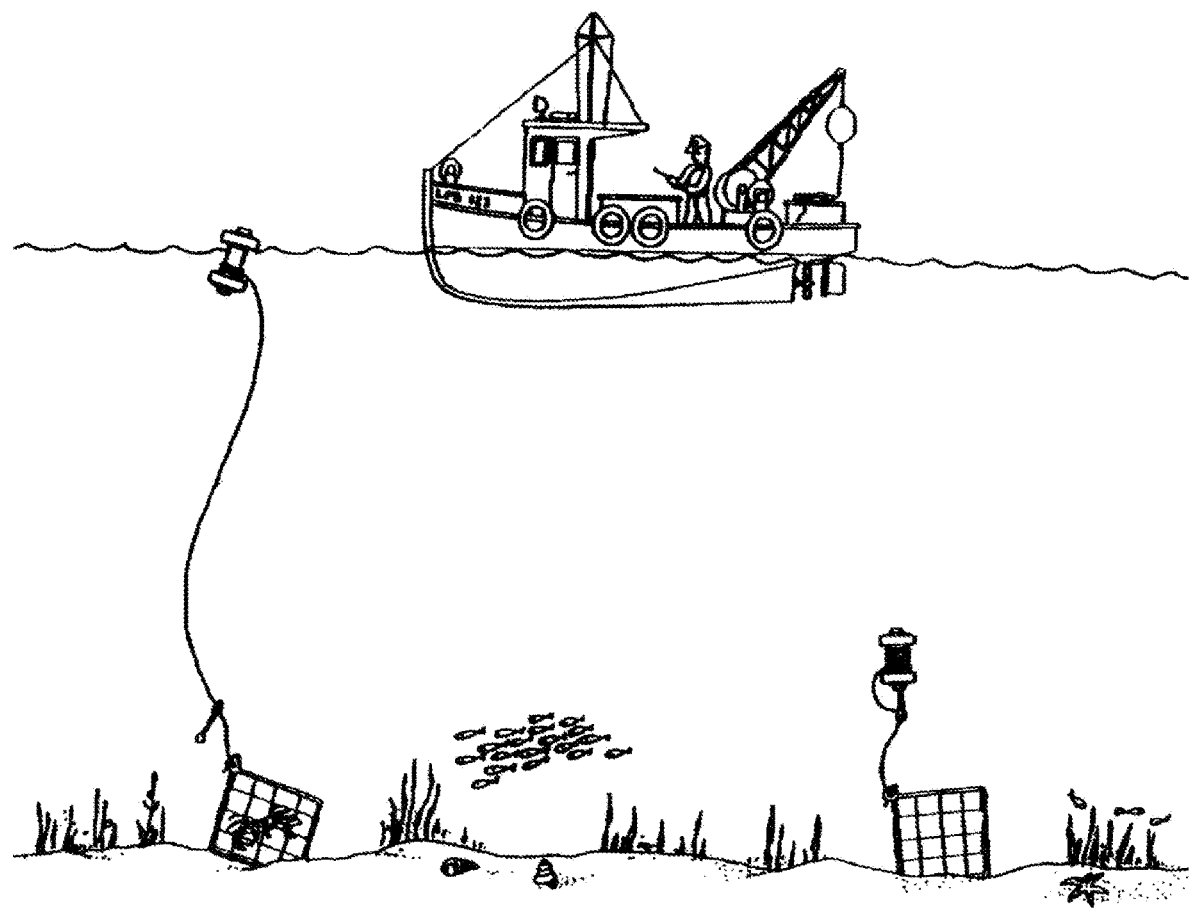
FIG. 1 shows a prior art depicting a method of recovering fishing trap in rope-less fishing using a buoyant spool.
Figure 2:
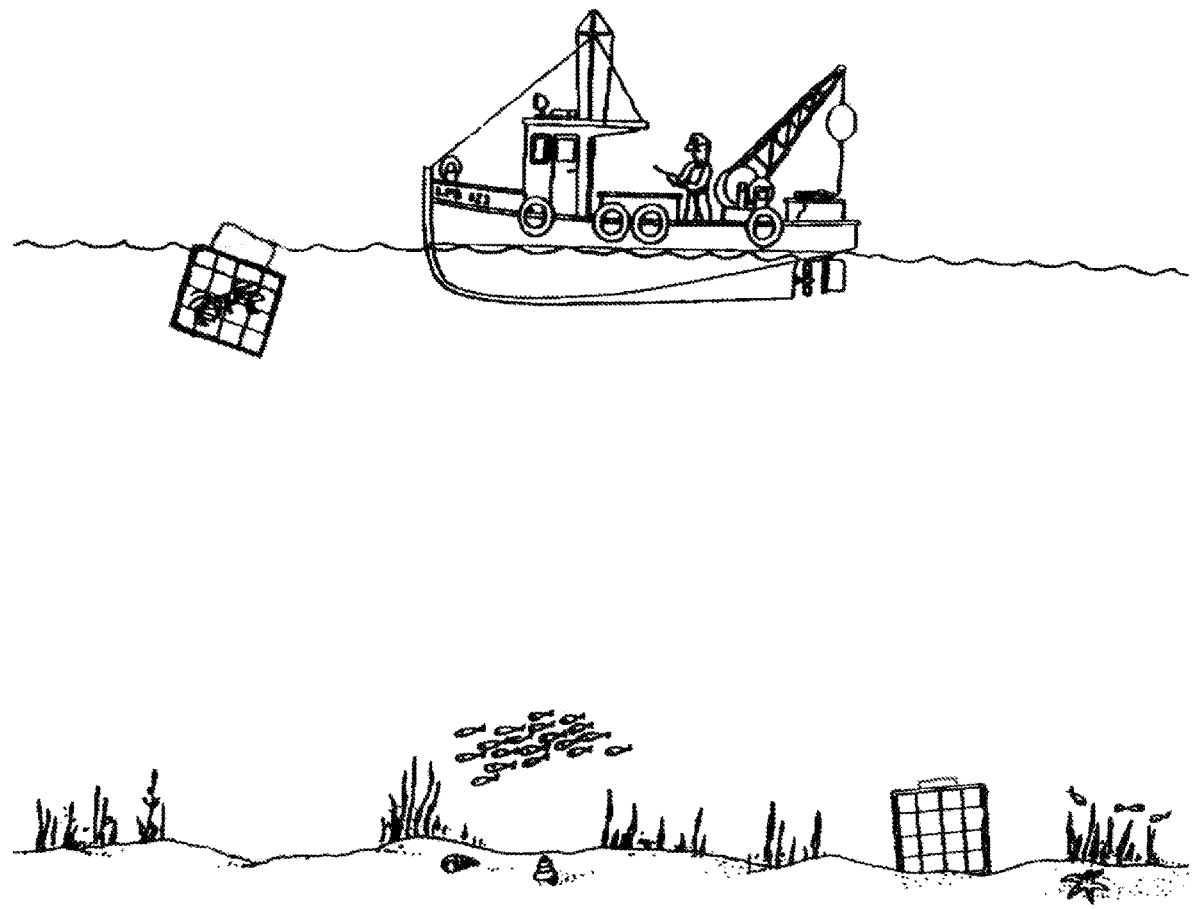
FIG. 2 shows a prior art depicting a method of recovering fishing trap in rope-less fishing using variable buoyancy.
Figure 3:
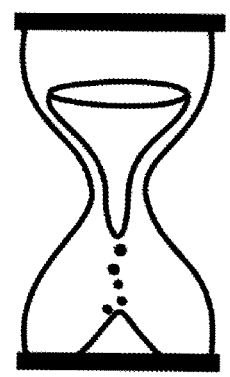
FIG. 3 shows a prior art depicting that sand is flowing down in an hourglass.
Figure 4:
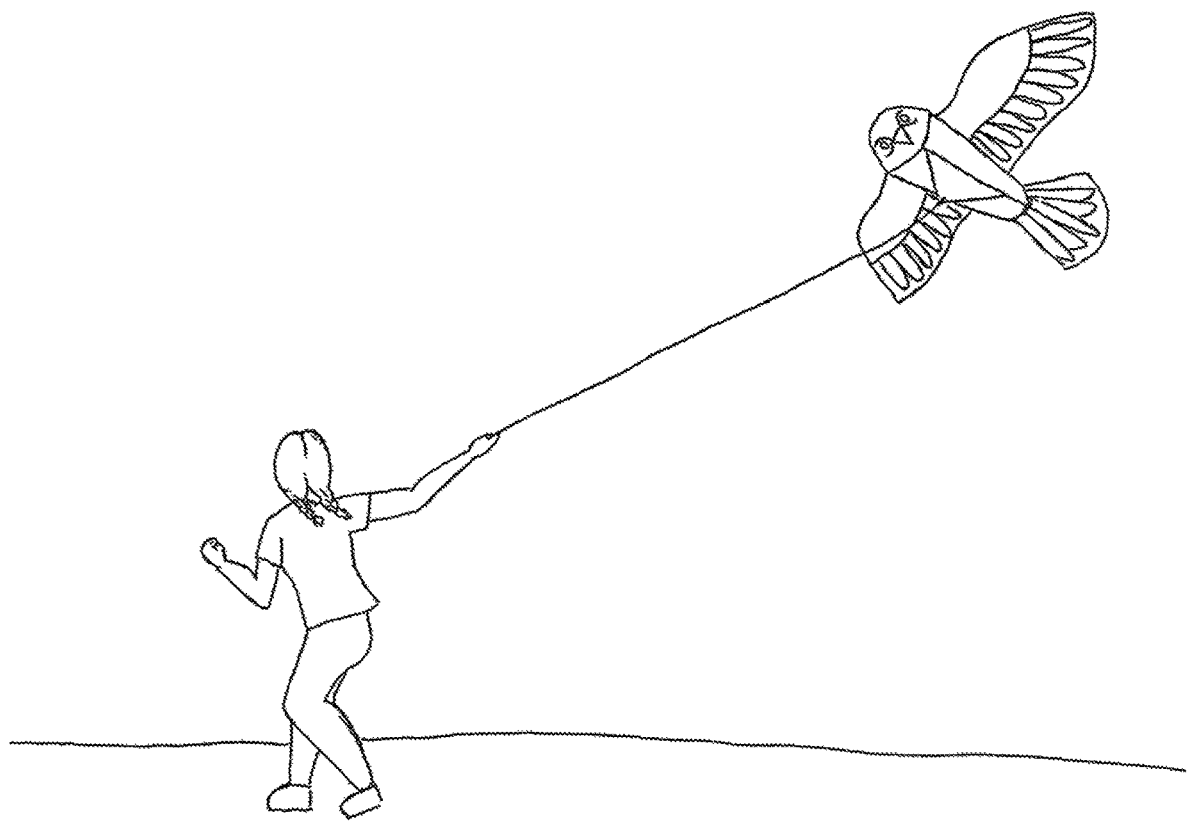
FIG. 4 shows a prior art depicting that a girl is playing with a kite.
Figure 5:
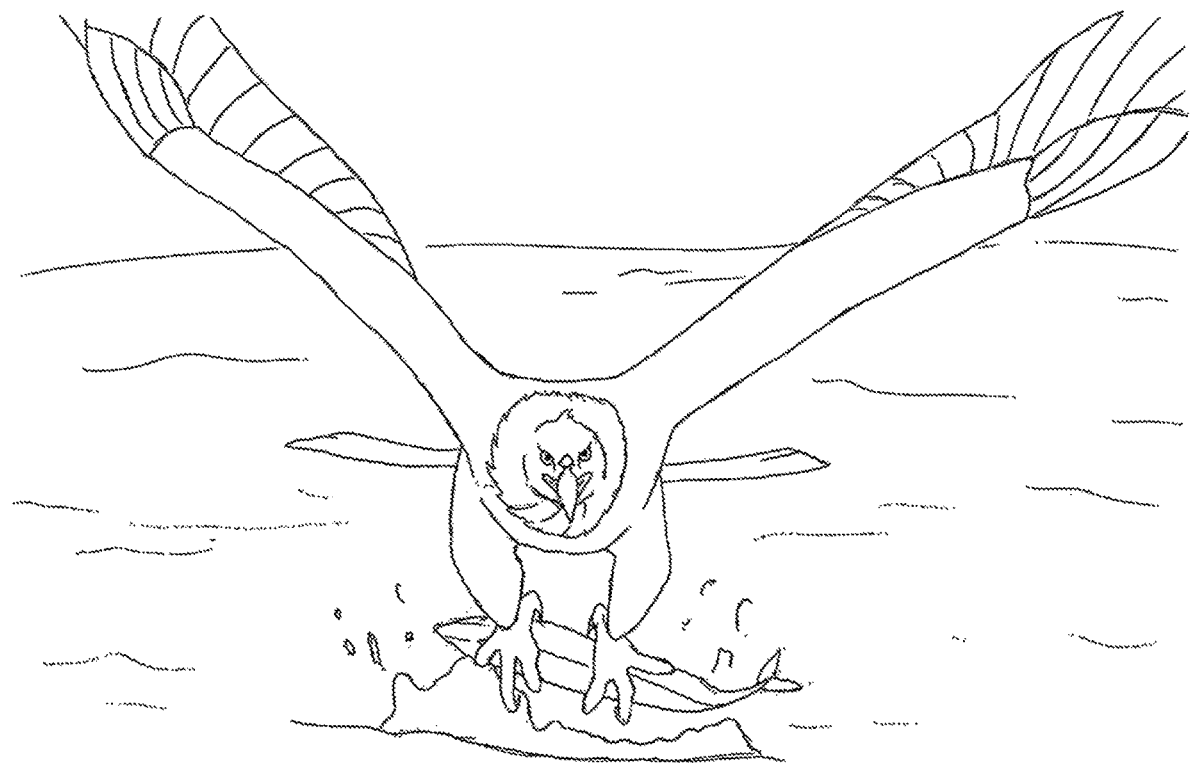
FIG. 5 shows a prior art depicting that an eagle is flying away with a fish caught from water.
Figure 6:
FIG. 6 shows a prior art depicting a speargun for spearfishing.
Figure 7:
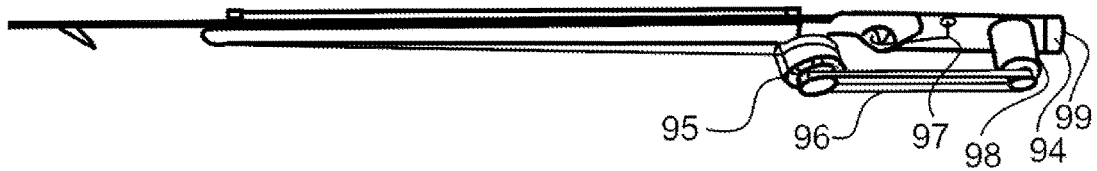
FIG. 7 shows a speargun enhancement of adding an automatic mechanism to rewind and to pull the trigger.
Figure 8:
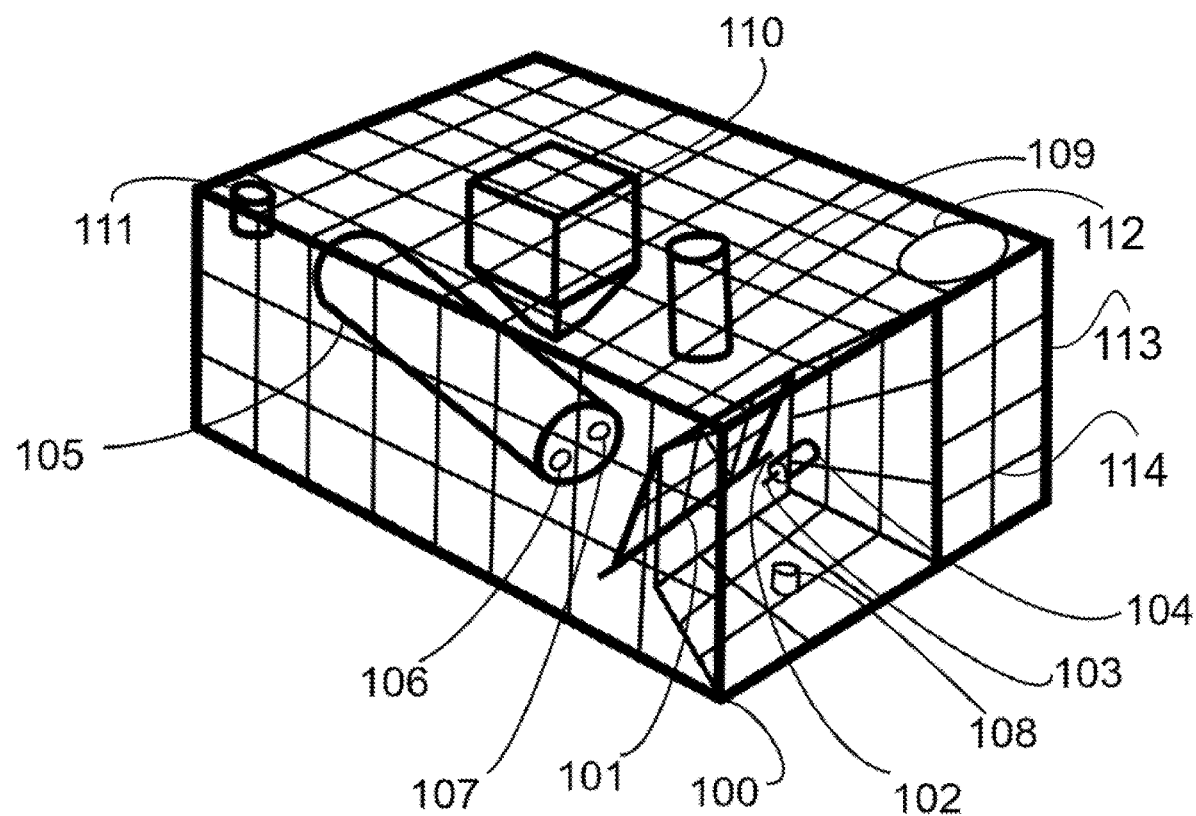
FIG. 8 is a perspective view of a fishing trap with an hourglass-like variable buoyancy device and artificial intelligence (AI) capability.
Figure 9:
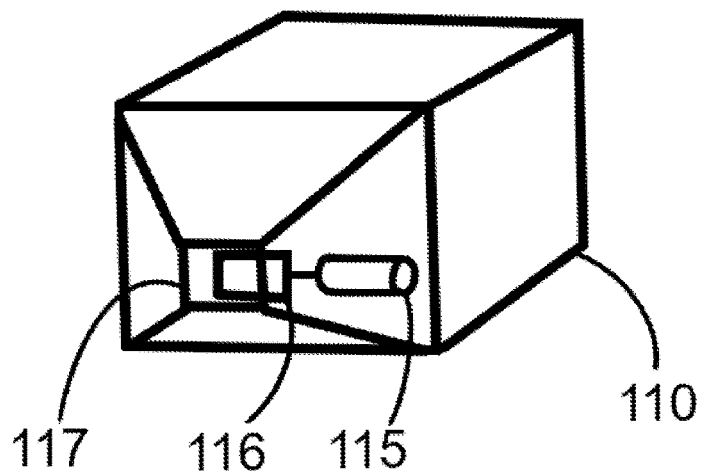
FIG. 9 is a perspective view of an hourglass-like variable buoyancy device, showing the door opening mechanism at the bottom of the device.

FIG. 8 is a perspective view of a fishing trap with an hourglass-like variable buoyancy device and AI capability. The fishing trap 100 is comprised of an outer frame 113, a net 114 wrapped around the frame, a door 101, a long rod 102, a door locker 104 with a locking rod 103 which engages an inner face of the door 101 to prevent the door 101 from being opened, a water-tight AI controller 105 with light 106, camera 107 and camera 108, a bait container 109, an hourglass-like variable buoyancy device 110, an acoustic modem 111, and a juvenile escape ring 112. Due to regulations, certain kinds of fish or shellfish such as female crabs have to be released if they are caught. The AI-capable sorting table shown in FIG. 17 can perform this task. Here the AI-capable fishing trap 100 complies with the regulations in another way. The door locker 104 can be configured to be normally locked with the locking rod 103 extended out to prevent the door 101 from opening. Bait inside the bait container 109 attracts fish or shellfish to the door 101. The light 106 provides lighting for the camera 107 and 108. The camera 107 captures the upper front view of the visitor in front of the door 101, and the camera 108 captures the bottom view. For a crab, the bottom view of the crab can be used to determine if the crab is female or male. Images of the visitor are processed by the AI controller 105 to categorize the visitor, including its size and sex if applicable. The door 101 will be unlocked only when no regulation will be violated as a result. For example, regulations prohibit capturing female crabs and crabs which are too small. Once a large visitor gets into the trap 100, it cannot escape because the long rod 102 prevents the door 101 from opening from inside by abutting against a portion of the entrance into the trap 100. The acoustic modem 111 communicates with modules on the surface in a predefined way such as communicating at a fixed interval or only starting to communicate after being pinged. Information of what is caught inside can also be sent out via the acoustic modem, and such information will enable a receiver module which receives the information from various traps to determine which fishing spot has higher concentrations of target fish or shellfish. After receiving the command to surface or when the battery level is below a predefined threshold, the hourglass-like variable buoyancy device 110 is activated to release substances contained inside. FIG. 9 is a perspective view of the device 110, showing the door opening mechanism at the bottom of the device. When door opener 115 pulls open door 116, heavier than water substances such as sand contained in the device 110 will start to flow out due to gravity, therefore reducing the total weight of the trap. When the total weight of the trap is reduced to be less than buoyance, the trap will start to float up. There are many ways to implement the door opener 115 and the door locker 104, such as using a solenoid or a servo.

Figure 10:
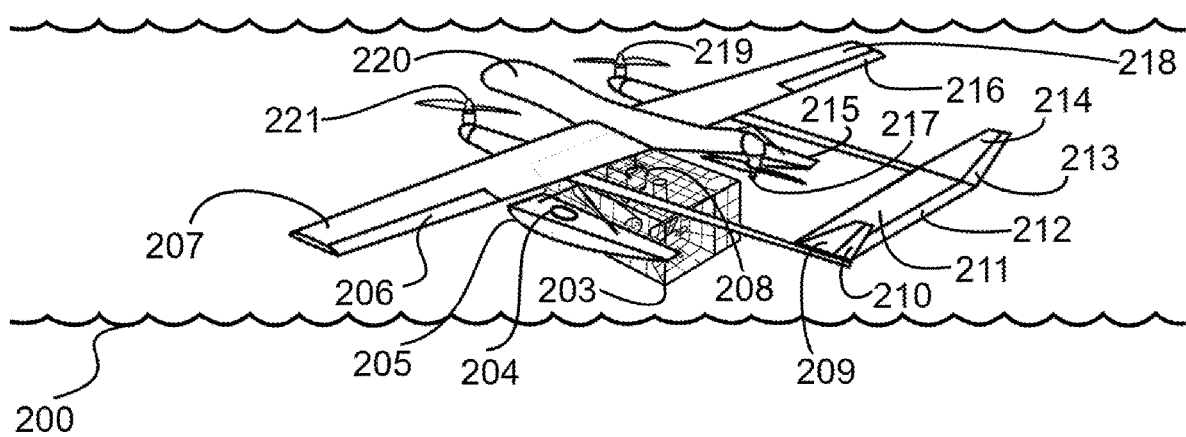
FIG. 10 is a perspective view of one embodiment of the invention, showing at water surface an unmanned aerial vehicle (UAV) capable of vertical take-off and landing (VTOL) is ready to take off vertically to transport a surfaced fishing trap.
Figure 10:
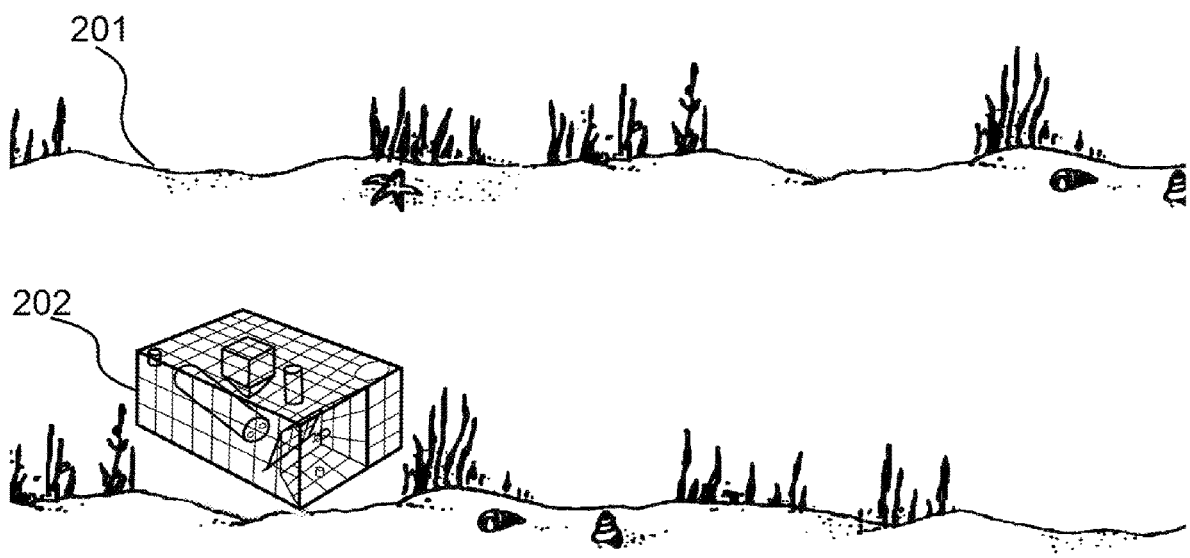
Figure 11:
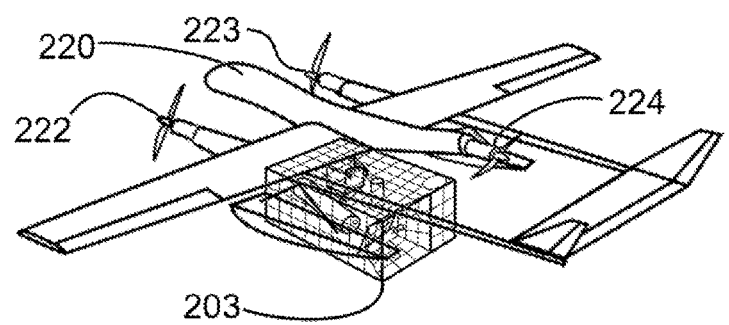
FIG. 11 is a perspective view of one embodiment of the invention, showing a VTOL UAV in horizontal flight mode with a fishing trap picked up from the water surface.
Figure 12:
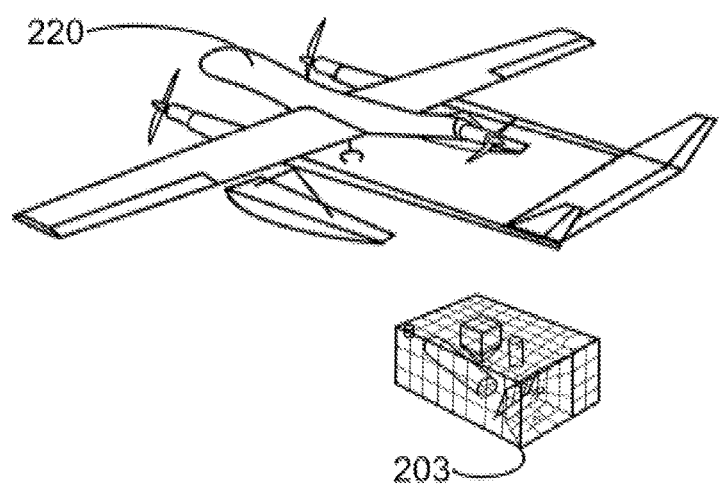
FIG. 12 is a perspective view of one embodiment of the invention, showing a fishing trap being deployed from the air by a UAV.

FIG. 10 is a perspective view of one embodiment of the invention, showing a VTOL UAV 220 at water surface 200 ready to vertically take off to transport a surfaced fishing trap 203. At the floor 201 of the body of water, such as the sea floor, lies an AI-capable fishing trap 202 with variable buoyancy. The VTOL UAV 220 is comprised of a left tilt rotor 221, a right tilt rotor 219, a rear tilt rotor 217, a left wing 207, a right wing 218, a left aileron 206, a right aileron 216, a right float 215, a left float 205 with an acoustic modem 204 inside to communicate with traps at the floor of the body of water, a mini robotic arm 208, a left vertical stabilizer 209, a right vertical stabilizer 214, a left rudder 210, a right rudder 213, a horizontal stabilizer 211 and an elevator 212. After landing at the water surface, the VTOL UAV 220 can find and communicate with traps also equipped with acoustic modems. After a trap reports the number of catches inside, it can be commanded to surface. Then the VTOL UAV 220 uses its mini robotic arm 208 to catch the surfaced trap, and vertically take off to transport the trap to a destination. The destination could be a boat on the surface of the body of water or a location on land such as the backyard of a house. FIG. 11 shows the VTOL UAV 220 carrying trap 203 flying horizontally above the water's surface with its rotors in horizontal flight mode. FIG. 12 shows the re-supplied trap 203 being deployed from the air by the UAV 220. The UAV 220 records location information such as the GPS coordinates of the trap drop location, so that the location information can be used to find and retrieve the trap.

Figure 13:
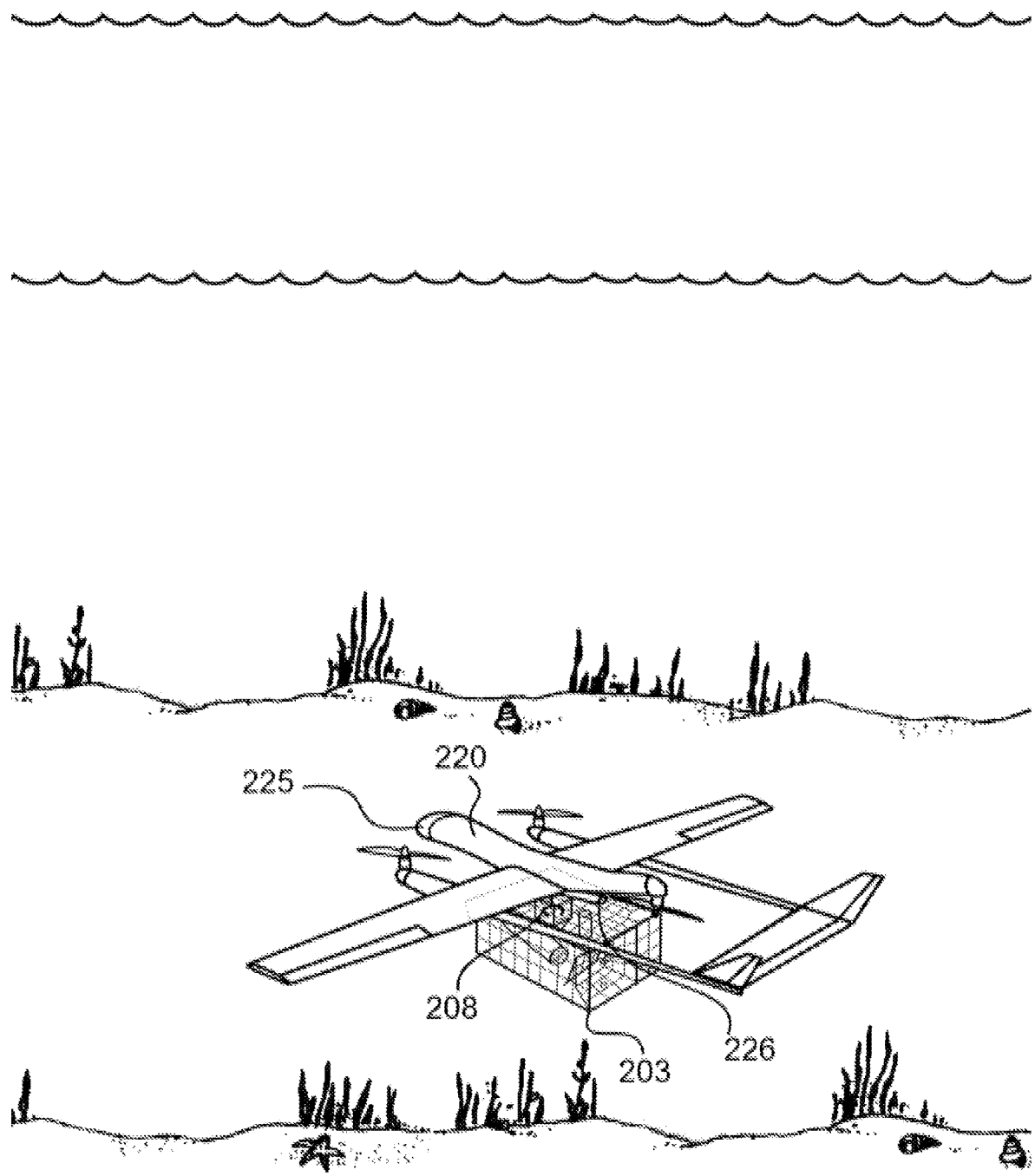
FIG. 13 is a perspective view of one embodiment of the invention, showing an autonomous aerial and underwater vehicle (A²UV), which is capable of flying both in air and underwater, picking up a fishing trap from the sea floor.
Figure 14:
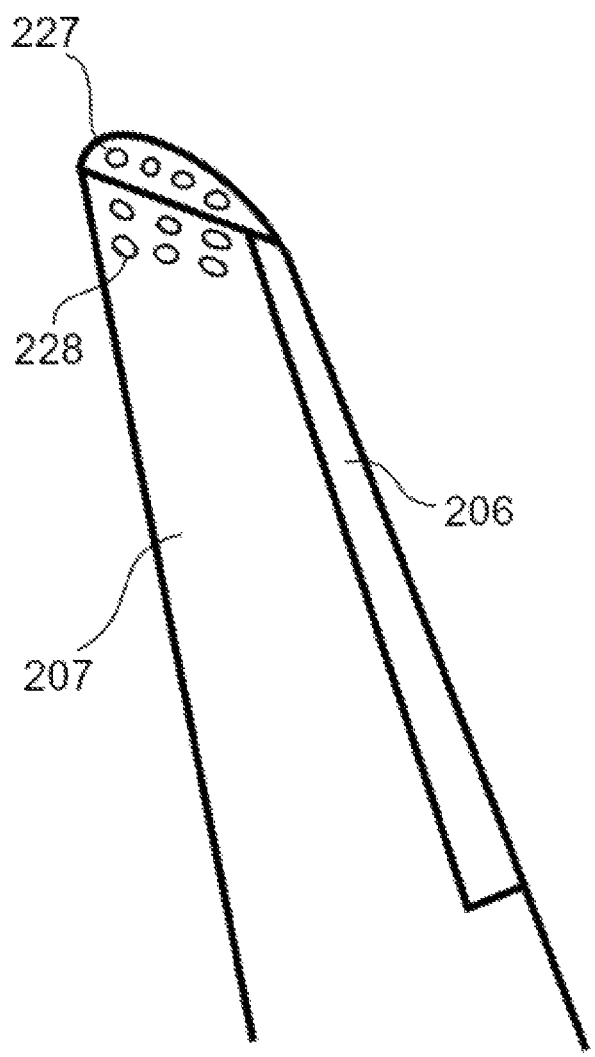
FIG. 14 is a perspective view of one embodiment of the invention, showing part of wing of an A²UV with holes at the wing tip for water to enter and exit from the A²UV.

FIG. 13 is a perspective view of one embodiment of the invention, showing an autonomous aerial and underwater vehicle (A$^2$UV) 220 picking up a fishing trap 203 from the sea (or lake or river) floor. Besides a sensor compartment 225 which houses various sensors such as camera, sonar and a speargun 226, other shown components are the same as the corresponding components shown in FIG. 10. Since the A$^2$UV can navigate underwater, it can pick up any trap equipped with an acoustic modem that can emit the information of the owner of the trap. It does not require the trap to have means of surfacing, because the A$^2$UV can bring the trap to the surface. FIG. 14 shows the outer part of a wing of an A$^2$UV with holes 227 at the wing tip and holes 228 under the wing tip. Through holes 227 and 228, water enters the A$^2$UV when it submerges therefore eliminating the need to have a strong water-tight vehicle body that can withstand the high pressures at the sea floor. When the A$^2$UV surfaces, water exits from holes 227 and 228 due to gravity. The A$^2$UV can further roll to the left and to the right to get rid of the remaining water onboard.

Figure 15:
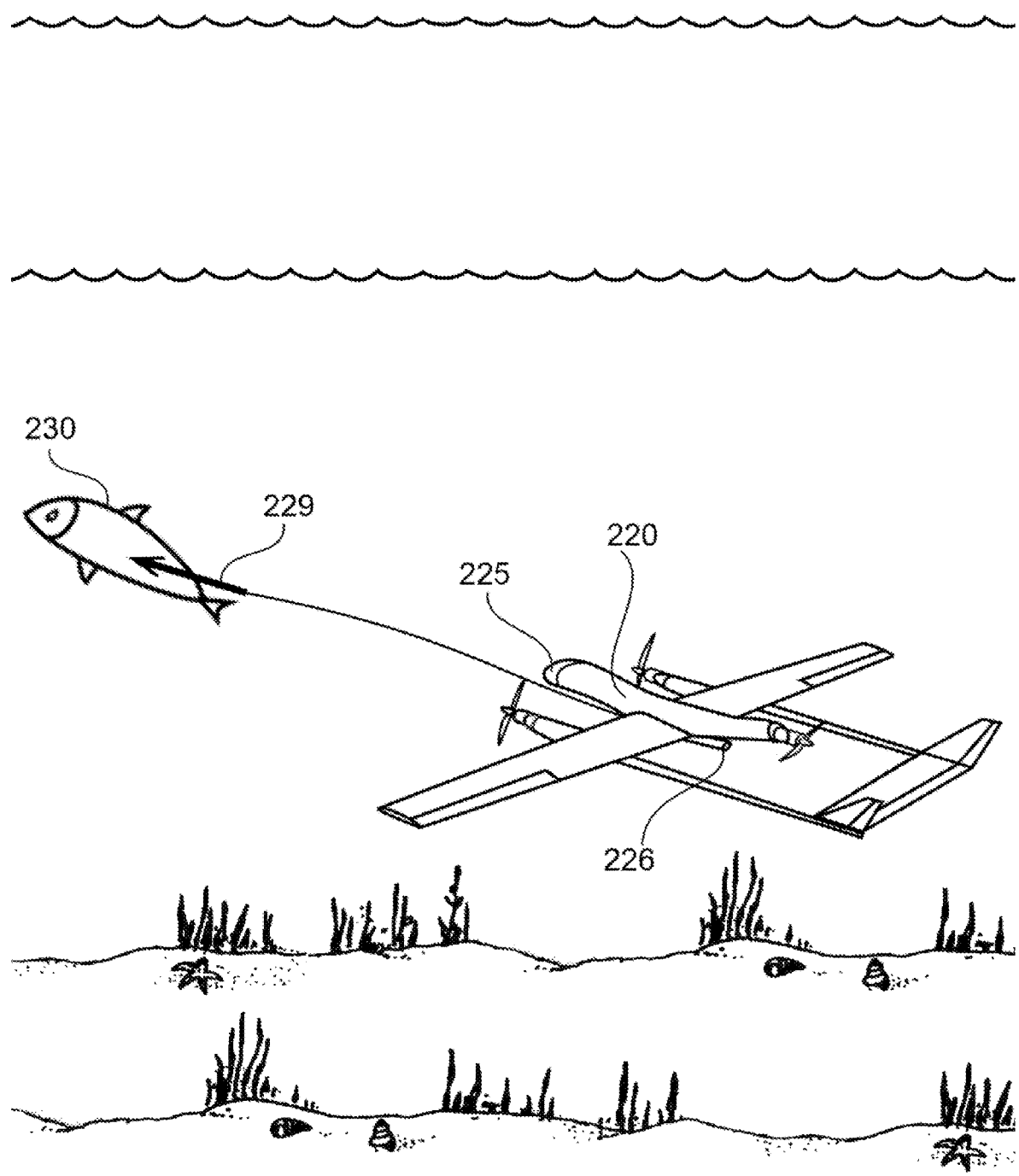
FIG. 15 is a perspective view of one embodiment of the invention, showing an A²UV spearfishing.
Figure 16:
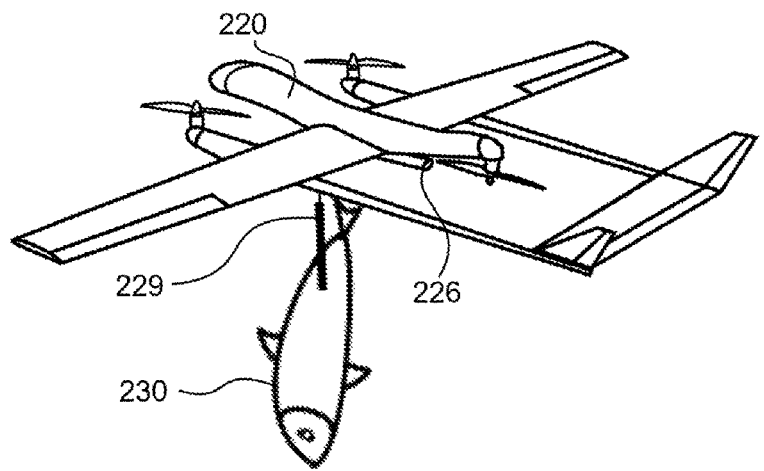
FIG. 16 is a perspective view of one embodiment of the invention, showing an A²UV vertically flying out of the water with a fish caught by a spear.

FIG. 15 is a perspective view of one embodiment of the invention, showing an A$^2$UV 220 spearfishing. After sonar and camera inside a sensor compartment 225 find and guide A$^2$UV onto a fish 230, a spear 229 launched by a speargun 226 pierces into the fish to catch the fish. As shown in FIG. 16, after rewinding the line attached to the spear, the A$^2$UV flies out of the water vertically with the fish caught by the spear. Later the A$^2$UV will transit to horizontal flight mode to transport the fish to a processing destination.

Figure 17:
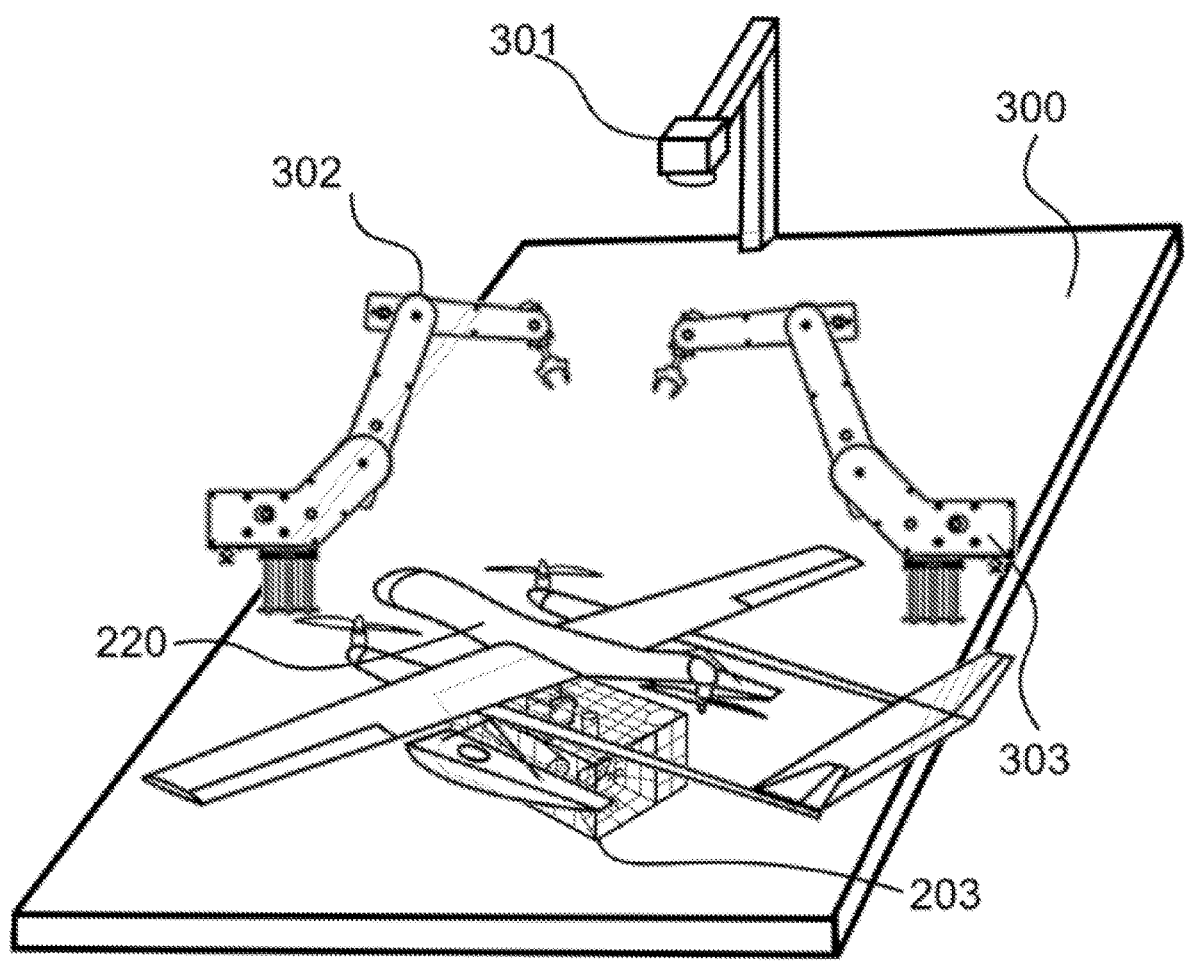
FIG. 17 is a perspective view of one embodiment of the invention, showing a VTOL UAV vertically landing to deliver a fishing trap onto an automatic sorting table with AI capability.

FIG. 17 shows that a VTOL UAV 220 is vertically landing to deliver a fishing trap 203 onto an automatic sorting table with AI capability. The sorting table is located on a boat on the water's surface or at a processing center on land. The sorting table is comprised of a flat surface 300, an image capturing and AI processing module 301 that is connected to a vertical post, a left robotic arm 302 and a right robotic arm 303. Additional robotic arms and additional image capturing and AI processing modules can be added to speed up the sorting process. For trap fishing, the robotic arms take out catches from traps and resupply the traps. The UAV then takes the resupplied trap away to storage or to re-deploy. The robotic arms take out the catch individually, then the image capturing and AI processing module captures and analyzes the image of the catch to determine category of the visitor, and size and sex of the catch if applicable. The robotic arms then keep the catch that complies with regulations and release the rest. Therefore, for trap fishing this invention eliminates the need of a rope attached to a trap, a buoy attached to the rope, the manual process of throwing a hook to catch the buoy, a line hauler to pull up all of the rope to get the trap out of the water and the manual process of sorting the catch. For spearfishing, the UAV delivers the catch onto the sorting table, and under the guide of the image-capturing and AI processing module, the robotic arms separate the catch from the spear, and then help reload the spear into the speargun. The sorting process of spearfishing is the same as that of trap fishing.

Figure 18:
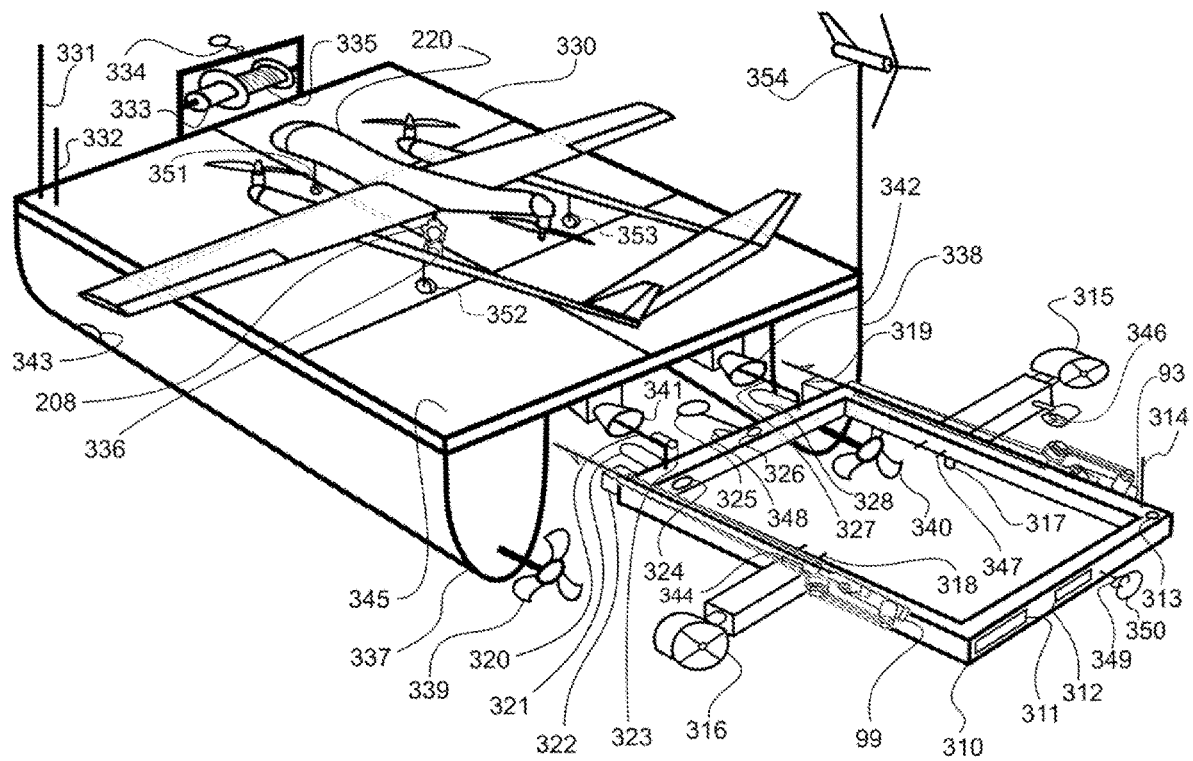
FIG. 18 is a perspective view of one preferred embodiment of the invention, showing an autonomous surface vehicle (ASV) charging and transporting an autonomous underwater vehicle (AUV) and a VTOL UAV.

FIG. 18 is a perspective view of one preferred embodiment of the invention, showing an autonomous surface vehicle (ASV) 330 charging and transporting an autonomous underwater vehicle (AUV) 310 and a VTOL UAV 220. The ASV is in form of geometry-stabilized catamaran, and is comprised of solar panel 345 as the top platform, a wind turbine 354 to generate electricity by capturing wind energy, a left hull 337, a right hull 338, a left propeller 339, a right propeller 340, an acoustic modem 343, a charging pole 336, a longer antenna 331 for longer wave long-range radio communication, a shorter antenna 332 for short-range radio communication, a reel 335 with a ring 334 attached to one end of a thread and a motor 333 to rewind, a left docking and charging receptacle 341 and a right docking and charging receptacle 342. The propellers also act as propeller turbines to generate electricity in kite mode. The UAV can land onto and take off vertically from the top platform. With the support of the ASV, the UAV can use the normal wheel type of landing gear 351, 352 and 353. When a mini robotic arm 208 of the UAV catches the charging pole 336, the ASV can recharge the UAV. The AUV is comprised of a left ducted propeller 316, a right ducted propeller 315, an auxiliary ducted propeller 346 that can move the AUV laterally in order to provide better positioning control when docking with a fish trap or when aiming at a fish during spearfishing, an optional left speargun 99 with a left latch 344 which can hold the left speargun in place, an optional right speargun 93, an optional claw 349 which can open and close to catch or release an optional ring 350 for attaching additional fishing mechanism, such as a line with one end connecting to the ring 350 and the other end to attach one or more hooks and bait, an AI controller 311, a battery compartment 312 holding and cooling batteries, an acoustic modem 313, an antenna 310 for radio communication when the AUV comes to the water surface, a downward looking camera 317, an inward looking camera 324 for docking control, an upward looking camera 326, a forward looking camera 323 for navigation and docking with the ASV, a sonar 348 to search fish or other underwater objects, a left aiming camera 322, a right aiming camera 319, a left light 321, a right light 328, a hook up ring 325, a left docking and charging plug 320, a right docking and charging plug 327, a left pair 318 of push rods and a right pair 347 of push rods, which are used to catch a fishing trap when docking with the fishing trap. The left and right ducted propeller can be tilted into horizontal mode and vertical mode to provide vectored thrust. When docking with the ASV, images captured by the forward looking camera 323 are fed into the AI controller 311, which controls propeller 315, 316 and 346 accordingly to move the docking and charging plug 320 and 327 into corresponding docking and charging receptacle 341 and 342 respectively. After the AUV is docked with the ASV, the ASV can charge the AUV through the docking and charging plug 320 and 327. A VTOL UAV can use a mini robotic arm to catch the hook up ring 325, then lift the AUV out of water and transport it to a destination.

Figure 19:
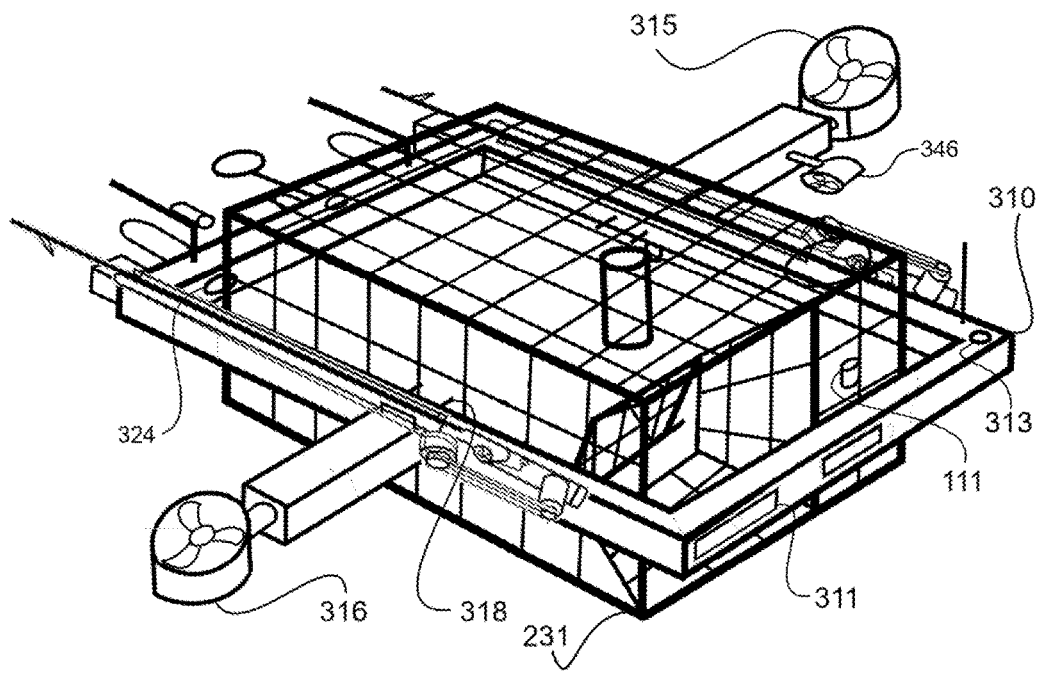
FIG. 19 is a perspective view of one embodiment of the invention, showing an AUV docked with a fishing trap in vertical motion mode.
Figure 20:
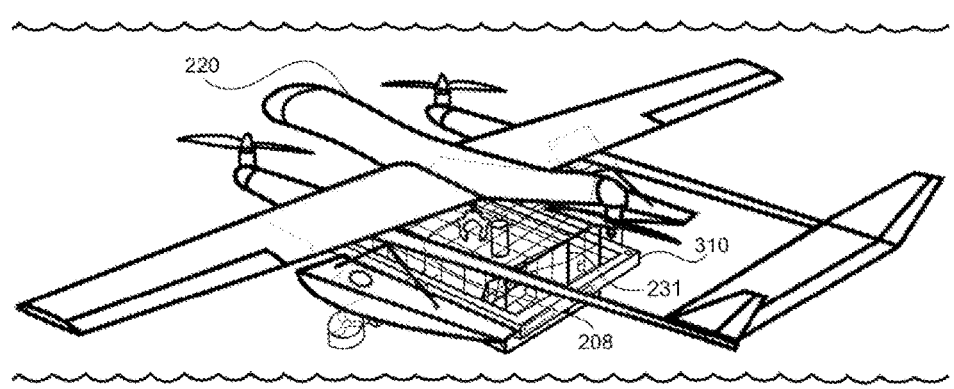
FIG. 20 is a perspective view of one embodiment of the invention, showing a fishing trap brought up to surface by an AUV being transferred over to a VTOL UAV.

FIG. 19 shows that an AUV 310 docks with a fishing trap 231. During the docking process, the propeller 346 provides lateral movement as needed, and the ducted propeller 315 and 316 provides up and down movement in vertical mode and back and forth movement in horizontal mode. Camera 324, 317 and 326 as shown in FIG. 18 provide various visual feedback to the AI controller 311 to control the docking approach. After the AUV gets into the right position, it pushes the push rod 318 and 347 inwards to catch the fishing trap. Then the ducted propeller 315 and 316 tilt into vertical mode to bring the trap up to water surface. The trap 231 is not required to have variable buoyance to surface on its own as the AUV can bring it up. After the trap 231 is brought up to the water surface, as shown in FIG. 20 a VTOL UAV 220 can dock with it and catch it, and then transport it to a destination.

Figure 21:
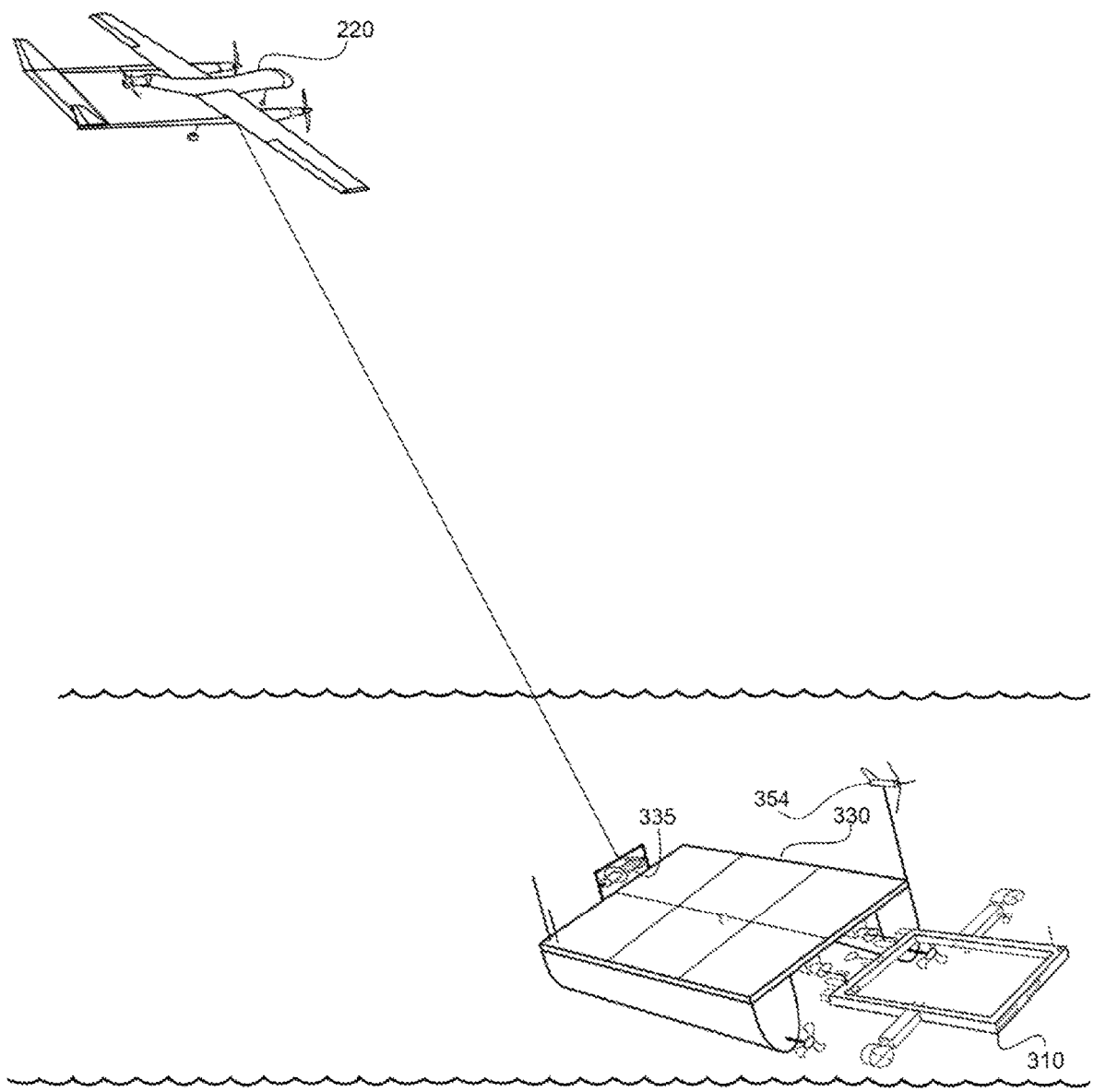
FIG. 21 is a perspective view of the preferred embodiment of the invention, showing an UAV, an ASV and an AUV in kite mode to capture renewable solar and wind energy.

FIG. 21 is a perspective view of the preferred embodiment of the invention, showing a UAV 220, an ASV 330 and an AUV 310 in kite mode to capture renewable solar and wind energy. With a thread from reel 335 connecting the UAV to the ASV, the UAV acts as a kite flying in the sky to capture wind energy with its propellers acting as wind turbines. The UAV acting like a kite drags the ASV to move, and the movement of the ASV turns the propellers of the ASV into water turbines to generate electric power. If the AUV is docked with the ASV, the AUV will also be dragged along, and such movement will turn the left and right propeller of the AUV into water turbines to generate electric power. A wind turbine 354 on the ASV 330 also captures wind energy to generate electricity. The solar panel on top of the ASV collects solar energy to generate electricity. The generated electric energy will be stored into rechargeable batteries onboard the UAV, the ASV and the AUV. By capturing renewable energy, this invention can greatly reduce operating costs while cost of fuel is a large portion of the total cost in a conventional fishing operation.

Figure 22:
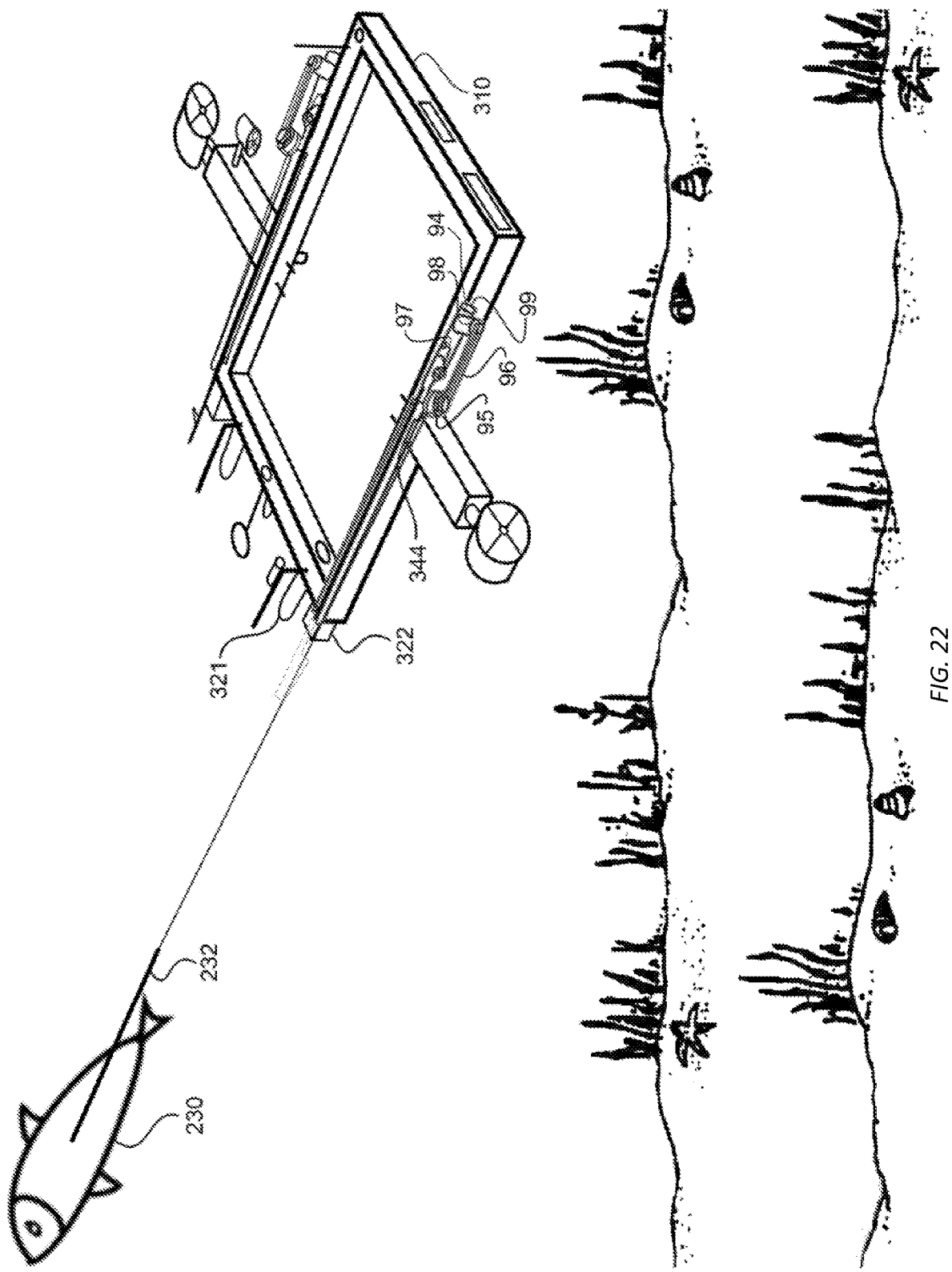
FIG. 22 is a perspective view of one embodiment of the invention, showing an AUV spearfishing.
Figure 23:
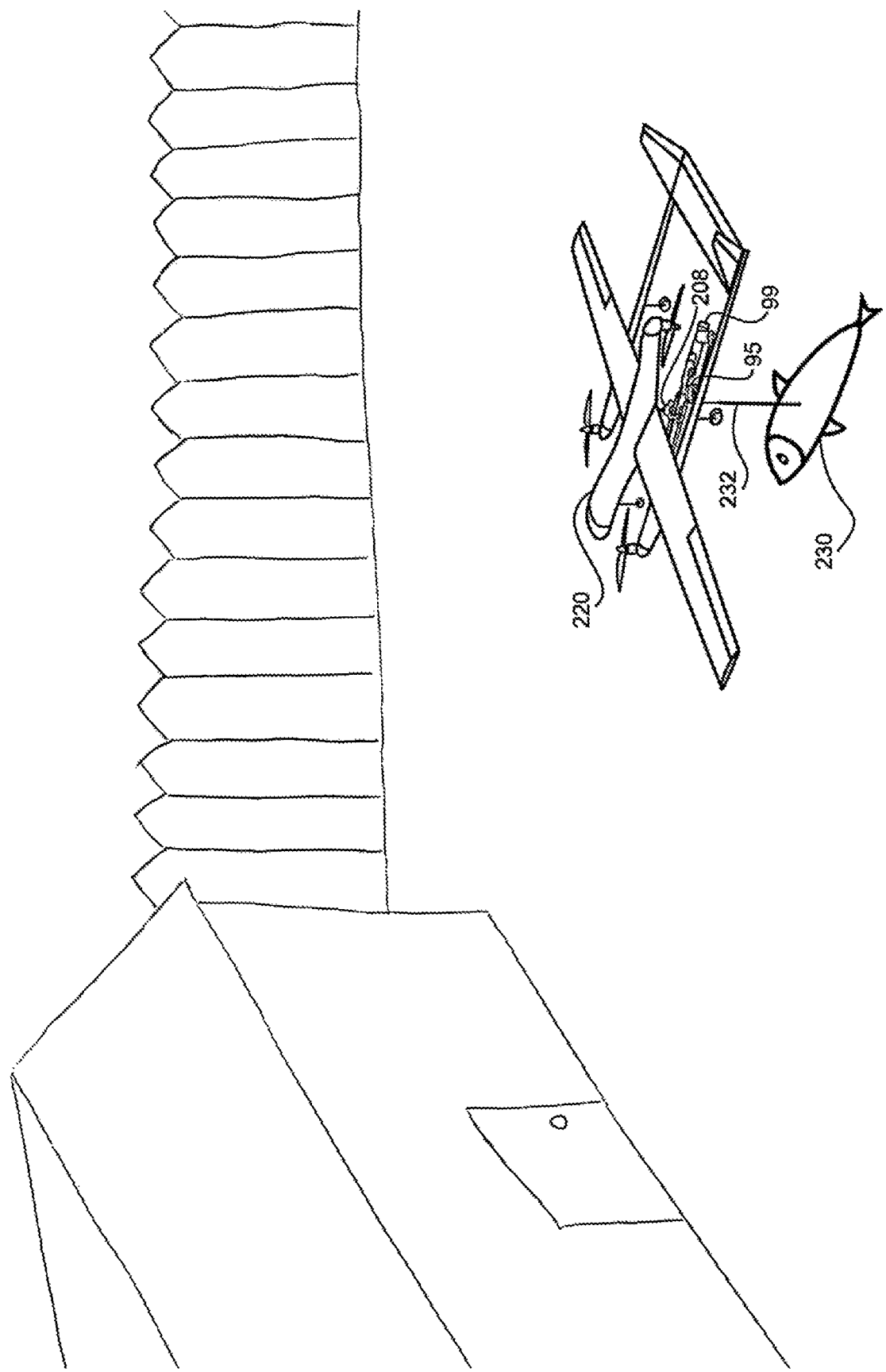
FIG. 23 is a perspective view of one embodiment of the invention, showing a VTOL UAV carrying a speargun and a fish captured by the spear launched by the speargun is landing in the backyard of a house to deliver the catch.

FIG. 22 shows an AUV 310 spearfishing. After sonar and camera onboard the AUV find and guide the AUV to a fish 230, a spear 232 launched by a speargun 99 pierces into the fish to catch the fish. After catching the fish, a motor 98 is activated to rewind a reel 95 to pull the fish towards the AUV. Afterwards, the AUV surfaces while carrying the catch. After the AUV surfaces, a VTOL UAV comes down to catch the speargun 99 with its mini robotic arm. A latch 344 is activated to release the speargun, and as shown in FIG. 23 the VTOL UAV can then take over the speargun 99, and transport the fish caught by the speargun 99 to a destination. The destination shown in FIG. 23 is a backyard of a house.

An Autonomous Seafood Capturing, Sorting, and Delivering System comprising: One or more submersible structures each such structure further comprising: a trap for capturing seafood within a cage, said cage volume contained therein; said cage has an outer frame, a net wrapped around said frame, a door, a long rod, and a door locker with a locking rod; said cage has a water-tight AI controller with one or more lights and two or more cameras; said cage has a bait container; said cage has a variable buoyancy device; and said cage has an underwater acoustic modem; wherein, said AI controller is capable of sorting seafood pursuant to the categorization of a seafood visitor, including its size and its sex if applicable pursuant to regulations; wherein, once said seafood visitor gets into the cage, the acoustic modem communicates with one or more modules on the surface in a predefined way; wherein, the information of what seafood is caught inside said cage is also sent out via the acoustic modem, and such information will enable a receiver module which receives the information from various traps to determine which fishing spot has higher concentrations of targeted seafood; and wherein, the variable buoyancy device is activated to release substances contained inside, after receiving the command to surface or when the battery level is below a predefined threshold.

Wherein said submersible structures are autonomous, said autonomous submersible structure has a spear and a speargun for launching said spear to into a fish to catch said fish; wherein after catching said fish, a motor is activated to rewind a reel to pull said fish towards said autonomous submersible structure; wherein thereafter, said autonomous submersible structure will surface while carrying said fish and dock to an unmanned aerial vehicle capable of vertical take-off and landing and then transport said submersible structure to a destination.

Further comprising a tender boat that remains in the general vicinity of said structures, and communicates with said structures. Further comprising a juvenile escape ring. Further comprising robotic underwater devices to clean said cage enclosures and remove debris and fatalities from said enclosures.

Wherein said submersible structures are autonomous, said autonomous submersible structures have a docking station for connecting to said cage. Wherein during the docking process, said autonomous submersible structures have one or more propellers provides lateral movement as needed, and one or more ducted propellers provides up and down movement in vertical mode and back and forth movement in horizontal mode. Wherein during the docking process, said autonomous submersible structures have one or more Cameras to provide various visual feedback to said AI controller to control the docking approach. Wherein after said autonomous submersible structures gets into the right position, said AI controller pushes push rods inwards to catch the cage. Wherein said ducted propeller and tilt into vertical mode to bring the trap up to water surface. Wherein after the trap is brought up to a water surface, an unmanned aerial vehicle capable of vertical take-off and landing can dock with said autonomous submersible structure and then transport said autonomous submersible structure to a destination.

Wherein said unmanned aerial vehicle is comprised of a left tilt rotor, a right tilt rotor, a rear tilt rotor, a left wing, a right wing, a left aileron, a right aileron, a left float with an acoustic modem inside to communicate with one or more traps at the floor of a body of water, a right float, a mini robotic arm, a left vertical stabilizer, a right vertical stabilizer, a left rudder, a right rudder, a horizontal stabilizer and an elevator.

Wherein after the trap is brought up to the water surface, an unmanned aerial vehicle capable of vertical take-off and landing is docked to said submersible structure and then transport said submersible structure to a destination.

Wherein said destination is an automatic sorting table with AI capability, said sorting table is comprised of a flat surface, an image capturing AI processing module, at least one left robotic arm and at least one right robotic arm; wherein said robotic arms takeout said seafood from said traps and resupply said traps; and wherein said unmanned aerial vehicle is capable of taking away the resupplied trap to be re-deployed.

An Autonomous Seafood Capturing, Sorting, and Delivering System comprising: an unmanned aerial vehicle capable of vertical take-off and landing, which docks with a submersible structure; said unmanned aerial vehicle is comprised of a left tilt rotor, a right tilt rotor, a rear tilt rotor, a left wing, a right wing, a left aileron, a right aileron, a left float with an acoustic modem inside to communicate with one or more traps at the floor of a body of water, a right float, a mini robotic arm, a left vertical stabilizer, a right vertical stabilizer, a left rudder, a right rudder, a horizontal stabilizer and an elevator; said submersible structure is comprised of: a trap for capturing seafood within a cage, said cage volume contained therein; said cage has an outer frame, a net wrapped around said frame, a door, a long rod, and a door locker with a locking rod; said cage has a water-tight AI controller with one or more lights and two or more cameras; said cage has a bait container; said cage has a variable buoyancy device; and said cage has an underwater acoustic modem.

Wherein, said unmanned aerial vehicle records location information such as the GPS coordinates of said trap drop location, so that the location information can be used to find and retrieve said trap; wherein, said AI controller is capable of sorting seafood pursuant to the categorization of a seafood visitor, including its size and its sex if applicable pursuant to regulations; wherein, once said seafood visitor gets into the cage, the acoustic modem communicates with one or more modules on the surface in a predefined way; wherein, the information of what seafood is caught inside said cage is also sent out via the acoustic modem, and such information will enable a receiver module which receives the information from various traps to determine which fishing spot has higher concentrations of targeted seafood; wherein, after landing at the water surface, the unmanned aerial vehicle can find and communicate with said traps also equipped with acoustic modems; and wherein, after said trap reports the number of catches inside, it can be commanded to surface.

Further comprise said submersible structure having a variable buoyancy device, which is activated to release substances contained inside, after receiving the command to surface at a predefined threshold.

Wherein said trap has a spear and a speargun for launching said spear to into a fish to catch said fish; wherein after catching said fish, a motor is activated to rewind a reel to pull said fish towards said autonomous submersible structure; wherein thereafter, said autonomous submersible structure will surface while carrying said fish and dock to an unmanned aerial vehicle capable of vertical take-off and landing and then transport said submersible structure to a destination.

Further comprising an unmanned aerial vehicle capable of going underwater to picking up said trap off the bottom of a sea floor, wherein said unmanned aerial vehicle is comprised of a left tilt rotor, a right tilt rotor, a rear tilt rotor, a left wing, a right wing, said left wing and right wing have one or more holes at the wing tip, a left aileron, a right aileron, a left float with an acoustic modem inside to communicate with one or more traps at the floor of a body of water, a right float, a mini robotic arm, a left vertical stabilizer, a right vertical stabilizer, a left rudder, a right rudder, a horizontal stabilizer and an elevator; wherein when said unmanned aerial vehicle submerges water enters through said holes on said right and left wing therefore eliminating the need to have a strong water-tight vehicle body that can withstand the high pressures at the sea floor; and wherein said unmanned aerial vehicle surfaces, water exits from said wing tip holes due to gravity and said unmanned aerial vehicle can further roll to the left and to the right to get rid of the remaining water onboard as said unmanned aerial vehicle takes off.

Further comprising an autonomous surface vehicle in form of a geometry-stabilized catamaran, which is comprised of solar panel as the top platform, a left hull, a right hull, a left propeller, a right propeller, an acoustic modem, a charging pole, a longer antenna for longer wave long-range radio communication, a shorter antenna for short-range radio communication, a reel with a ring attached to one end of its threads and a motor to rewind, a left docking and charging receptacle and a right docking and charging receptacle for connecting and docking to said submersible structure having said cameras for docking control, an upward looking camera, a forward looking camera for navigation and docking with said autonomous surface vehicle.

Wherein said propellers also act as propeller turbines to generate electricity when in kite mode to capture renewable wind energy for said autonomous surface vehicle, when said autonomous surface vehicle utilizes said thread from said reel to connect to said unmanned aerial vehicle that acts as a kite flying in the sky to capture wind energy with said autonomous surface vehicle having said propellers acting as wind turbines and said unmanned aerial vehicle acting like a kite drags the said autonomous surface vehicle to create movement and the movement of said autonomous surface vehicle turns said propellers of the autonomous surface vehicle into water turbines to generate electric power; and wherein said autonomous submersible structure is docked with said autonomous surface vehicle, said autonomous submersible structure will also be dragged along, and such movement will also turn the left and right propellers of said autonomous submersible structure into water turbines to further generate electric energy, wherein said generated electric energy will be stored into rechargeable batteries onboard said autonomous submersible structure and said autonomous surface vehicle, thereby greatly reduce operating costs of fuel which is a large portion of the total cost in a conventional fishing operation.

Wherein said solar panel on top of the said autonomous surface vehicle collects solar energy to generate electricity, wherein said generated electric energy will be stored into rechargeable batteries onboard said autonomous submersible structure and said autonomous surface vehicle, thereby greatly reduce operating costs of fuel which is a large portion of the total cost in a conventional fishing operation.

Wherein after the trap is brought up to the water surface, said unmanned aerial vehicle capable of vertical take-off and landing is docked to said submersible structure and then transport said submersible structure to a destination.

Further comprising said unmanned aerial vehicle has a robotic arm to catch said trap, when said trap is brought up to said water surface, and then said unmanned aerial vehicle can vertically take off to transport said trap to a destination; and wherein said destination is an automatic sorting table with AI capability, said sorting table is comprised of a flat surface, an image capturing AI processing module, at least one left robotic arm and at least one right robotic arm; wherein said robotic arms takeout said seafood from said traps and resupply said traps; and wherein said unmanned aerial vehicle is capable of taking away the resupplied trap to be re-deployed.

While the description above refers to particular embodiments of the present invention, it will be understood that many modifications may be made without departing from the spirit thereof. The presently disclosed embodiments are therefore to be considered in all respects as illustrative and not restrictive.

We claim:

1. An autonomous seafood capturing, sorting, and delivering system comprising:
    one or more submersible structures, wherein each of said one or more submersible structures further comprising:
       (a) a trap for capturing seafood within a cage, said cage has a volume contained therein;
       (b) said cage has an outer frame, a net wrapped around said frame, a door, a long rod, and a door locker with a locking rod, where said door locker is attached to said cage and positioned by said door so said locking rod of the door locker can be extended out to prevent said door from opening, where said long rod is attached to a bottom of said door and prevents said door from opening from inside said cage;
       (c) said cage has a water-tight AI controller with one or more lights and two or more cameras;
       (d) said cage has a bait container;
       (e) said cage has a variable buoyancy device; and
       (f) said cage has an underwater acoustic modem;
    wherein, said AI controller is capable of sorting the seafood pursuant to a categorization of a seafood visitor, including its size and its sex if applicable pursuant to regulations;
    wherein, once said seafood visitor gets into the cage, the acoustic modem communicates with one or more modules on a surface of the water in a predefined way;
    wherein, information of what seafood is caught inside said cage is also sent out via the acoustic modem, and the information will enable a receiver module of said one or more modules which receives the information from various traps to determine which fishing spot has higher concentrations of targeted seafood;
    wherein, the variable buoyancy device is activated to release substances contained inside of the variable buoyancy device, after receiving a command to surface or when a battery level is below a predefined threshold; and
    wherein said one or more submersible structures are autonomous, each of said one or more autonomous submersible structures has a spear and a speargun for launching said spear into a fish to catch said fish; wherein after catching said fish, a motor is activated to rewind a reel to pull said fish towards said each of said one or more autonomous submersible structures; wherein thereafter, said each of said one or more autonomous submersible structures will surface while carrying said fish and dock to an unmanned aerial vehicle capable of vertical take-off and landing and then transport said each of said one or more submersible structures to a destination.

2. An autonomous seafood capturing, sorting, and delivering system comprising:
    an unmanned aerial vehicle capable of vertical take-off and landing, which docks with one or more submersible structures;
    said unmanned aerial vehicle has a body comprising: a left wing and a right wing, which are both connected to said body, and a left tilt rotor that is connected to the left wing and a right tilt rotor that is connected to the right wing and a rear tilt rotor that is connected to a rear of said body, said left wing and right wing have one or more holes at wing tips thereof and a left aileron and a right aileron are respectively positioned on said left and right wings, a mini robotic arm which is connected to a bottom of said body, a left vertical stabilizer having a left rudder, a right vertical stabilizer having a right rudder, a horizontal stabilizer having an elevator, and wherein all three of said stabilizers are attached to the rear of said unmanned aerial vehicle;
    said one or more submersible structures is comprised of: a trap for capturing seafood within a cage, said cage has a volume contained therein; said cage has an outer frame, a net wrapped around said frame, a door, a long rod, and a door locker with a locking rod and said long rod connects to said door to engage with said locking rod of said door locker; said cage has a water-tight AI controller with one or more lights and two or more cameras; said cage has a bait container; said cage has a variable buoyancy device; and said cage has an underwater acoustic modem;
    wherein, said unmanned aerial vehicle records location information such as the GPS coordinates of said trap drop location, so that the location information can be used to find and retrieve said trap;
    wherein, said AI controller is capable of sorting the seafood pursuant to a categorization of a seafood visitor, including its size and its sex if applicable pursuant to regulations;
    wherein, once said seafood visitor gets into the cage, the acoustic modem communicates with one or more modules on a water surface in a predefined way;
    wherein, information of what seafood is caught inside said cage is also sent out via the acoustic modem, and the information will enable a receiver module of the one or more modules which receives the information from various traps to determine which fishing spot has higher concentrations of targeted seafood;
    wherein, after landing at the water surface, the unmanned aerial vehicle can find and communicate with said traps also equipped with acoustic modems; and
    wherein, after said trap reports a number of catches inside, it can be commanded to surface.

3. The system of claim 2, wherein said unmanned aerial vehicle is capable of going underwater to pick up said trap off a bottom of a sea floor; wherein said left wing and right wing have one or more holes at wing tips thereof; wherein when said unmanned aerial vehicle submerges, water enters through said one or more holes of said left wing and said right wing at the wing tips, therefore eliminating the need to have a strong water-tight vehicle body that can withstand high pressures at the sea floor; and wherein said unmanned aerial vehicle surfaces, water exits from said one or more holes at the wing tips due to gravity and said unmanned aerial vehicle can further roll to the left and to the right to get rid of the remaining water onboard as said unmanned aerial vehicle takes off.

4. The system of claim 2, wherein said one or more submersible structures having a variable buoyancy device, which is activated to release substances contained inside of said variable buoyancy device, after receiving a command to surface at a predefined threshold.

5. The system of claim 2, wherein said one or more submersible structures can be autonomous, said one or more submersible structures each comprising an autonomous underwater vehicle having a docking station for connecting to said cage; wherein said autonomous underwater vehicle having said cage for capturing the seafood further utilizes a spear and a speargun for launching said spear into a fish to catch said fish; wherein after catching said fish, a motor is activated to rewind a reel to pull said fish towards said autonomous underwater vehicle; wherein thereafter, said autonomous underwater vehicle will surface while carrying said fish and dock to said unmanned aerial vehicle capable of vertical take-off and landing which will then transport said autonomous underwater vehicle to a destination.

6. The system of claim 2, wherein said one or more submersible structures are autonomous, said one or more autonomous submersible structures become an underwater vehicle.

7. The system of claim 2, wherein after the trap is brought up to the water surface, said unmanned aerial vehicle capable of vertical take-off and landing is docked to said one or more submersible structures and then transports said submersible structure to a destination.

8. The system of claim 2, further comprising said unmanned aerial vehicle having a mini robotic arm to catch said trap, when said trap is brought up to said water surface, and then said unmanned aerial vehicle can vertically take off to transport said trap to a destination.

9. The system of claim 5, 7, or 8, wherein said destination is an automatic sorting table with AI capability, where said sorting table is comprised of a flat surface, an image capturing AI processing module that is connected to a vertical post which can see over the entire sorting table and where said vertical post and said image capturing AI processing module are connected to said flat surface, said sorting table has at least one left robotic arm and at least one right robotic arm that are connected to said sorting table; wherein said robotic arms take out the seafood from said traps and resupply said traps; and wherein said unmanned aerial vehicle is capable of taking away the resupplied traps to be re-deployed.

10. The system of claim 1, further comprising an autonomous surface vehicle in the form of a geometry-stabilized catamaran, comprising: a solar panel as a top platform of the catamaran that is connected to a left hull and a right hull, wherein said left hull has a left propeller and said right hull has a right propeller, an acoustic modem that is attached to one or more hulls of said left and right hulls that are positioned in the water, a charging pole that is connected to said top platform, a longer antenna that is attached to said top platform for longer wave long-range radio communication and a shorter antenna attached to said top platform for short-range radio communication, a reel with a ring attached to one end of a thread and a motor to rewind the reel, wherein a left docking and charging receptacle is connected and positioned on an underside of said platform and a right docking and charging receptacle is connected and positioned on the underside of said platform for connecting and docking to an autonomous underwater vehicle of said one or more submersible structures having cameras for docking control.

11. The system of claim 10, wherein said propellers also act as propeller turbines to generate electricity when in kite mode to capture renewable wind energy for said autonomous surface vehicle, when said autonomous surface vehicle utilizes said thread from said reel to connect to said unmanned aerial vehicle that acts as a kite flying in the sky to capture wind energy with said autonomous surface vehicle having said propellers acting as wind turbines and said unmanned aerial vehicle acting like a kite drags said autonomous surface vehicle to create movement and the movement of said autonomous surface vehicle turns said propellers of the autonomous surface vehicle into water turbines to generate electric power; and wherein when said autonomous underwater vehicle is docked with said autonomous surface vehicle, said autonomous underwater vehicle will also be dragged along, and such movement will also turn the left and right propellers of said automated underwater vehicle into water turbines to further generate electric energy, wherein the generated electric energy will be stored into rechargeable batteries onboard said autonomous underwater vehicle and said autonomous surface vehicle, thereby greatly reducing operating costs of fuel which is a large portion of the total cost in a conventional fishing operation.

12. The system of claim 10, wherein said solar panel as a top platform of said catamaran collects solar energy to generate electricity, wherein the generated electric energy will be stored into rechargeable batteries onboard an autonomous submersible structure of said one or more submersible structures and said autonomous surface vehicle, thereby greatly reducing operating costs of fuel which is a large portion of the total cost in a conventional fishing operation.

13. An autonomous seafood capturing, sorting, and delivering system comprising:
one or more submersible structures, wherein each of said one or more submersible structures further comprising:
(a) a trap for capturing seafood within a cage, said cage has a volume contained therein;
(b) said cage has an outer frame, a net wrapped around said frame, a door, a long rod, and a door locker with a locking rod, where said door locker is attached to said cage and positioned by said door so said locking rod of the door locker can be extended out to prevent said door from opening, where said long rod is attached to a bottom of said door and prevents said door from opening from inside said cage;
(c) said cage has a water-tight AI controller with one or more lights and two or more cameras;
(d) said cage has a bait container;
(e) said cage has a variable buoyancy device; and
(f) said cage has an underwater acoustic modem;
wherein, said AI controller is capable of sorting the seafood pursuant to a categorization of a seafood visitor, including its size and its sex if applicable pursuant to regulations;
wherein, once said seafood visitor gets into the cage, the acoustic modem communicates with one or more modules on a surface of the water in a predefined way;
wherein, information of what seafood is caught inside said cage is also sent out via the acoustic modem, and the information will enable a receiver module of said one or more modules which receives the information from various traps to determine which fishing spot has higher concentrations of targeted seafood;

wherein, the variable buoyancy device is activated to release substances contained inside of the variable buoyancy device, after receiving a command to surface or when a battery level is below a predefined threshold;

further comprising an unmanned aerial vehicle capable of going underwater to pick up said trap off a bottom of a sea floor, wherein said unmanned aerial vehicle has a body comprising: a left wing and a right wing, which are both connected to said body, and a left tilt rotor that is connected to the left wing and a right tilt rotor that is connected to the right wing and a rear tilt rotor that is connected to a rear of said body, said left wing and right wing have one or more holes at wing tips thereof and a left aileron and a right aileron respectively positioned on said left and right wings, a mini robotic arm which is connected to a bottom of said body, a left vertical stabilizer having a left rudder, a right vertical stabilizer having a right rudder, and a horizontal stabilizer having an elevator, wherein all of said stabilizers are attached to the rear of said body; and wherein when said unmanned aerial vehicle submerges, water enters through said one or more holes at said wing tips of said right and left wings therefore eliminating the need to have a strong water-tight vehicle body that can withstand high pressures at a sea floor; and wherein when said unmanned aerial vehicle surfaces, water exits from said one or more holes at said wing tips due to gravity and said unmanned aerial vehicle can further roll to the left and to the right to get rid of the remaining water onboard as said unmanned aerial vehicle takes off.

14. An autonomous seafood capturing, sorting, and delivering system comprising:
one or more submersible structures, wherein each of said one or more submersible structures further comprising:
(a) a trap for capturing seafood within a cage, said cage has a volume contained therein;
(b) said cage has an outer frame, a net wrapped around said frame, a door, a long rod, and a door locker with a locking rod, where said door locker is attached to said age and positioned by said door so said locking rod of the door locker can be extended out to prevent said door from opening, where said long rod is attached to a bottom of said door and prevents said door from opening from inside said cage;
(c) said cage has a water-tight AI controller with one or more lights and two or more cameras;
(d) said cage has a bait container;
(e) said cage has a variable buoyancy device; and
(f) said cage has an underwater acoustic modem;

wherein, said AI controller is capable of sorting the seafood pursuant to a categorization of a seafood visitor, including its size and its sex if applicable pursuant to regulations;

wherein, once said seafood visitor gets into the cage, the acoustic modem communicates with one or more modules on a water surface in a predefined way, wherein, information of what seafood is caught inside said cage is also sent out via the acoustic modem, and the information will enable a receiver module of said one or more modules which receives the information from various traps to determine which fishing spot has higher concentrations of targeted seafood;

wherein, the variable buoyancy device is activated to release substances contained inside of the variable buoyancy device, after receiving a command to surface or when a battery level is below a predefined threshold, wherein said one or more submersible structures are autonomous, each of said one or more submersible structures comprises an autonomous underwater vehicle having a docking station for connecting to said cage; and further comprising an autonomous surface vehicle in the form of a geometry-stabilized catamaran, comprising: a solar panel as a top platform of the catamaran that is connected to a left hull and a right hull, wherein said left hull has a left propeller and said right hull has a right propeller, an acoustic modem that is attached to one or more of said left and right hulls that are positioned in the water, a charging pole that is connected to said top platform, a longer antenna that is attached to said top platform for longer wave long-range radio communication and a shorter antenna attached to said top platform for short-range radio communication, a reel with a ring attached to one end of a thread and a motor to rewind the reel, wherein a left docking and charging receptacle is connected and positioned on an underside of said platform and a right docking and charging receptacle is connected and positioned on the underside of said platform for connecting and docking to said autonomous underwater vehicle having cameras for docking control.

15. The system of claim 14, wherein said propellers also act as propeller turbines to generate electricity when in kite mode to capture renewable wind energy for said autonomous surface vehicle, when said autonomous surface vehicle utilizes said thread from said reel to connect to an unmanned aerial vehicle that acts as a kite flying in the sky to capture wind energy with said autonomous surface vehicle having said propellers acting as wind turbines and said unmanned aerial vehicle acting like a kite drags said autonomous surface vehicle to create movement and the movement of said autonomous surface vehicle turns said propellers of the autonomous surface vehicle into water turbines to generate electric power; and wherein when said autonomous underwater vehicle is docked with said autonomous surface vehicle, said autonomous surface vehicle will also be dragged along, and such movement will also turn left and right propellers of said autonomous underwater vehicle into water turbines to further generate electric energy, wherein the generated electric energy will be stored into rechargeable batteries onboard said autonomous underwater vehicle and said autonomous surface vehicle, thereby greatly reducing operating costs fuel which is a large portion of the total cost in a conventional fishing operation.

16. The system of claim 14, wherein said solar panel as a top platform of said catamaran collects solar energy to generate electricity, wherein the generated electric energy will be stored into rechargeable batteries onboard said autonomous underwater vehicle and said autonomous surface vehicle, thereby greatly reducing operating costs of fuel which is a large portion of the total cost in a conventional fishing operation.

17. An autonomous seafood capturing, sorting, and delivering system comprising:
one or more submersible structures, wherein each of said one or more submersible structures further comprising:
(a) a trap for capturing seafood within a cage, said cage has a volume contained therein;
(b) said cage has an outer frame, a net wrapped around said frame, a door, a long rod, and a door locker with a locking rod, where said door locker is attached to said cage and positioned by said door so said locking rod of the door locker can be extended out to prevent said door from opening, where said long rod is attached to a bottom of said door and prevents said door from opening from inside said cage;
(c) said cage has a water-tight AI controller with one or more lights and two or more cameras;
(d) said cage has a bait container;
(e) said cage has a variable buoyancy device; and
(f) said cage has an underwater acoustic modem;

wherein, said AI controller is capable of sorting the seafood pursuant to a categorization of a seafood visitor, including its size and its sex if applicable pursuant to regulations;

wherein, once said seafood visitor gets into the cage, the acoustic modem communicates with one or more modules on a water surface in a predefined way;

wherein, information of what seafood is caught inside said cage is also sent out via the acoustic modem, and the information will enable a receiver module of said one or more modules which receives the information from various traps to determine which fishing spot has higher concentrations of targeted seafood;

wherein, the variable buoyancy device is activated to release substances contained inside of the variable buoyancy device, after receiving a command to surface or when a battery level is below a predefined threshold;

wherein said one or more submersible structures are autonomous, each of said one or more submersible structures comprises an autonomous underwater vehicle having a docking station for connecting to said cage;

wherein during a docking process, said autonomous underwater vehicle have one or more propellers that provide lateral movement as needed, and said one or more propellers provide up and down movement in vertical mode and back and forth movement in horizontal mode;

wherein during the docking process, said autonomous underwater vehicle has one or more cameras to provide various visual feedback to said AI controller to control a docking approach;

wherein after said autonomous underwater vehicle gets into the right position, said AI controller has means to push rods of said autonomous underwater vehicle inwards to catch said cage;

wherein said autonomous underwater vehicle has said one or more propellers that tilt into the vertical mode to bring the trap up to the water surface;

wherein after the trap is brought up to the water surface, an unmanned aerial vehicle capable of vertical take-off and landing can dock with said autonomous underwater vehicle and then transport said autonomous underwater vehicle to a destination; and wherein said unmanned aerial vehicle has a body comprising: a left wing and a right wing, which are both connected to said body, and a left tilt rotor that is connected to the left wing and a right tilt rotor that is connected to the right wing and a rear tilt rotor that is connected to a rear of said body, said left wing and right wing have one or more holes at wing tips thereof and a left aileron and a right aileron respectively positioned on said left and right wings, a mini robotic arm which is connected to a bottom of said body, a left vertical stabilizer having a left rudder, a right vertical stabilizer having a right rudder, a horizontal stabilizer having an elevator, and wherein all three of said stabilizers are attached to the rear of said body.

* * * * *